United States Patent
Esmaeili et al.

(10) Patent No.: US 10,082,840 B2
(45) Date of Patent: Sep. 25, 2018

(54) ELECTRONIC DEVICE WITH MOVEABLE CONTACTS AT AN EXTERIOR SURFACE

(71) Applicant: Apple Inc., Cupertino, CA (US)

(72) Inventors: Hani Esmaeili, Sunnyvale, CA (US);
Oliver Ross, San Francisco, CA (US);
Brett Degner, Menlo Park, CA (US);
Daniel Wagman, Los Gatos, CA (US);
Eric S. Jol, San Jose, CA (US); Ibuki Kamei, San Jose, CA (US); Mahmoud R. Amini, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/697,326

(22) Filed: Sep. 6, 2017

(65) Prior Publication Data

US 2017/0364125 A1 Dec. 21, 2017

Related U.S. Application Data

(63) Continuation of application No. 15/256,470, filed on Sep. 2, 2016, now Pat. No. 9,778,705.

(Continued)

(51) Int. Cl.
*G06F 1/16* (2006.01)
*H01R 13/62* (2006.01)
*G06F 3/02* (2006.01)

(52) U.S. Cl.
CPC .......... *G06F 1/1684* (2013.01); *G06F 1/1626* (2013.01); *G06F 1/1632* (2013.01);

(Continued)

(58) Field of Classification Search
CPC combination set(s) only.
See application file for complete search history.

(56) References Cited

U.S. PATENT DOCUMENTS

| | | |
|---|---|---|
| 8,344,836 B2 | 1/2013 | Lauder et al. |
| 8,498,100 B1 | 7/2013 | Whitt et al. |

(Continued)

FOREIGN PATENT DOCUMENTS

| | | |
|---|---|---|
| AU | 2011100424 | 6/2011 |
| CN | 100414778 | 8/2008 |

(Continued)

OTHER PUBLICATIONS

Ex-Parte Quayle Action for U.S. Appl. No. 15/256,470, dated Jun. 27, 2017, 8 pages.

(Continued)

*Primary Examiner* — Lisa Lea Edmonds
(74) *Attorney, Agent, or Firm* — Kilpatrick Townsend & Stockton LLP

(57) ABSTRACT

An accessory device including a foldable cover, a keyboard assembly coupled to the foldable cover and including a plurality of individually depressible keys, an attachment feature connected to the enclosure and configured to magnetically couple the accessory device with the electronic device. The attachment feature includes an exterior surface, a plurality of openings formed through the exterior surface, a plurality of movable contacts corresponding in number to the plurality of openings, each movable contact extending out of one of the plurality of openings, and an alignment feature comprising at least one magnet positioned adjacent to the plurality of openings.

20 Claims, 15 Drawing Sheets

Related U.S. Application Data

(60) Provisional application No. 62/215,707, filed on Sep. 8, 2015, provisional application No. 62/215,714, filed on Sep. 8, 2015, provisional application No. 62/254,033, filed on Nov. 11, 2015, provisional application No. 62/215,592, filed on Sep. 8, 2015, provisional application No. 62/214,671, filed on Sep. 4, 2015.

(52) U.S. Cl.
CPC .......... *G06F 1/1662* (2013.01); *G06F 1/1669* (2013.01); *G06F 1/1681* (2013.01); *G06F 3/0202* (2013.01); *H01R 13/6205* (2013.01); *G06F 2200/1633* (2013.01); *G06F 2200/1634* (2013.01)

(56) References Cited

U.S. PATENT DOCUMENTS

| | | | |
|---|---|---|---|
| 8,570,725 B2 | 10/2013 | Whitt, III et al. | |
| 8,699,215 B2 | 4/2014 | Whitt, III et al. | |
| 8,724,302 B2 | 5/2014 | Whitt, III et al. | |
| 8,780,540 B2 | 7/2014 | Whitt, III et al. | |
| 8,780,541 B2 | 7/2014 | Whitt, III et al. | |
| 8,830,668 B2 | 9/2014 | Whitt, III et al. | |
| 8,873,227 B2 | 10/2014 | Whitt, III et al. | |
| 8,878,637 B2 | 11/2014 | Sartee et al. | |
| 8,903,517 B2 | 12/2014 | Perek et al. | |
| 8,928,437 B2* | 1/2015 | Lauder .................. | G06F 1/1626 206/320 |
| 8,947,864 B2 | 2/2015 | Whitt, III et al. | |
| 8,953,310 B2 | 2/2015 | Smith et al. | |
| 8,975,991 B2 | 3/2015 | Lauder et al. | |
| 8,988,876 B2 | 3/2015 | Corbin et al. | |
| 9,000,871 B2 | 4/2015 | Cencioni | |
| 9,036,340 B1 | 5/2015 | Colby et al. | |
| 9,075,566 B2 | 7/2015 | Whitt, III et al. | |
| 9,149,100 B2 | 10/2015 | Marshall et al. | |
| 9,158,384 B2 | 10/2015 | Whitt, III et al. | |
| 9,176,900 B2 | 11/2015 | Whitt, III et al. | |
| 9,176,901 B2 | 11/2015 | Whitt, III et al. | |
| 9,335,793 B2 | 5/2016 | Rothkopf | |
| 9,455,759 B2 | 9/2016 | Jen et al. | |
| 9,485,338 B2 | 11/2016 | Balaji et al. | |
| 9,497,300 B2* | 11/2016 | Longo .................. | H04M 1/0212 |
| 9,778,705 B2* | 10/2017 | Esmaeili .............. | G06F 1/1684 |
| 9,876,303 B2* | 1/2018 | Wagman ............... | H01R 13/521 |
| 9,893,452 B2* | 2/2018 | Wagman ............... | H01R 13/2442 |
| 9,941,627 B2* | 4/2018 | Esmaeili ............. | H01R 13/6205 |
| 2004/0005184 A1* | 1/2004 | Kim ...................... | G06F 1/1618 400/472 |
| 2004/0209489 A1* | 10/2004 | Clapper ............. | H01R 13/6205 439/39 |
| 2005/0026499 A1 | 2/2005 | Choi et al. | |
| 2007/0072443 A1* | 3/2007 | Rohrbach .......... | H01R 13/6205 439/39 |
| 2008/0232061 A1* | 9/2008 | Wang .................... | G06F 1/1632 361/679.41 |
| 2009/0247004 A1 | 10/2009 | Lou et al. | |
| 2010/0226509 A1 | 9/2010 | Filson et al. | |
| 2012/0194448 A1* | 8/2012 | Rothkopf ............ | A45C 13/002 345/173 |
| 2013/0035006 A1* | 2/2013 | Park ..................... | H01R 12/714 439/862 |
| 2013/0083465 A1* | 4/2013 | Motoishi ................ | G06F 1/1613 361/679.21 |
| 2013/0162554 A1 | 6/2013 | Lauder et al. | |
| 2013/0183861 A1 | 7/2013 | Chang et al. | |
| 2013/0322000 A1 | 12/2013 | Whitt, III et al. | |
| 2014/0106594 A1 | 4/2014 | Skvoretz et al. | |
| 2014/0204514 A1 | 7/2014 | Whitt, III et al. | |
| 2014/0211445 A1* | 7/2014 | Hirai ..................... | G06F 1/1654 361/809 |
| 2014/0273546 A1* | 9/2014 | Harmon ............ | H01R 13/6205 439/39 |
| 2014/0285957 A1 | 9/2014 | Rohrbach et al. | |
| 2014/0377992 A1 | 12/2014 | Chang et al. | |
| 2015/0049426 A1* | 2/2015 | Smith ................... | A45C 11/00 361/679.27 |
| 2015/0055284 A1* | 2/2015 | Han ...................... | G06F 1/1616 361/679.12 |
| 2015/0093922 A1 | 4/2015 | Bosscher et al. | |
| 2015/0194764 A1* | 7/2015 | Magana ............. | H01R 13/6205 439/39 |
| 2015/0241931 A1* | 8/2015 | Carnevali ............... | G06F 1/181 361/679.41 |
| 2015/0266610 A1* | 9/2015 | Melmon ............... | B65D 5/5206 206/45.23 |
| 2016/0093975 A1* | 3/2016 | Katiyar .................. | H01F 1/147 439/38 |
| 2016/0179142 A1* | 6/2016 | Liang ..................... | G06F 1/1656 361/679.17 |
| 2017/0058276 A1 | 3/2017 | Wagman et al. | |
| 2017/0060180 A1* | 3/2017 | Griffin, II ............ | G06F 1/1607 |
| 2017/0068276 A1* | 3/2017 | Wagman ............... | G06F 1/1643 |
| 2017/0068286 A1 | 3/2017 | Esmaeili et al. | |
| 2017/0069993 A1 | 3/2017 | Wagman et al. | |
| 2017/0069994 A1 | 3/2017 | Wagman et al. | |
| 2017/0205847 A1* | 7/2017 | Wagman ............... | G06F 1/1607 |

FOREIGN PATENT DOCUMENTS

| | | |
|---|---|---|
| CN | 101807752 | 8/2010 |
| CN | 103718384 | 4/2014 |
| CN | 104137019 | 11/2014 |
| CN | 106505334 | 3/2017 |
| CN | 106505344 | 3/2017 |
| CN | 106505349 | 3/2017 |
| EP | 3142193 | 3/2017 |
| JP | S50-93595 U1 | 8/1975 |
| JP | 0577772 | 10/1993 |
| JP | 8003932 | 1/1996 |
| JP | 6323776 | 2/1998 |
| JP | 10208809 | 8/1998 |
| JP | 11329634 | 11/1999 |
| JP | 2006120498 | 5/2006 |
| JP | 2017076604 | 4/2017 |
| JP | 2017076605 | 5/2017 |
| KR | 1020060039930 | 5/2006 |
| KR | 1020130015367 | 2/2013 |
| TW | 498709 | 8/2002 |
| TW | 201714362 | 4/2017 |
| TW | 201721988 | 6/2017 |
| TW | 201721996 | 6/2017 |

OTHER PUBLICATIONS

Notice of Allowance for U.S. Appl. No. 15/256,470, dated Jul. 27, 2017, 8 pages.
U.S. Appl. No. 105128657, "Office Action", dated Jun. 30, 2017, 10 pages.
U.S. Appl. No. 15/138,216, "Notice of Allowance", dated Apr. 26, 2017, 9 Pages.
U.S. Appl. No. 15/138,216, "U.S. Patent Application No.", Low-Profile Power and Data Contacts, dated Apr. 26, 2016.
U.S. Appl. No. 15/138,224, "Notice of Allowance", dated May 23, 2017, 7 pages.
U.S. Appl. No. 15/138,224, "U.S. Patent Application No.", Low-Profile Spring-Loaded Contact, dated Apr. 26, 2016.
U.S. Appl. No. 15/256,432, "U.S. Patent Application", dated Sep. 2, 2016.
Australia Application No. AU2016222504, "First Examiner Report", dated Apr. 27, 2017, 4 pages.
Australia Application No. AU2016222505, "First Examiner Report", dated Apr. 28, 2017, 3 pages.
Australia Application No. AU2016225784, "First Examination Report", dated Jun. 8, 2017, 3 pages.
China Application No. CN201621039180.5, "Office Action", dated Mar. 28, 2017, 3 pages.

(56) References Cited

OTHER PUBLICATIONS

China Application No. CN2016210417275, "Evaluation Report for Utility Model", dated May 26, 2017, 19 pages.
European Application No. EP16187185.0, "Extended European Search Report", dated Jun. 13, 2017, 12 pages.
Korean Application No. KR10-2016-0112084, "Office Action", dated Jul. 18, 2017, 16 pages.
Taiwan Application No. TW105128162, "Office Action", dated May 25, 2017, 6 pages.
Office Action for CN201720722071.1, dated Nov. 29, 2017, 4 pages.

* cited by examiner

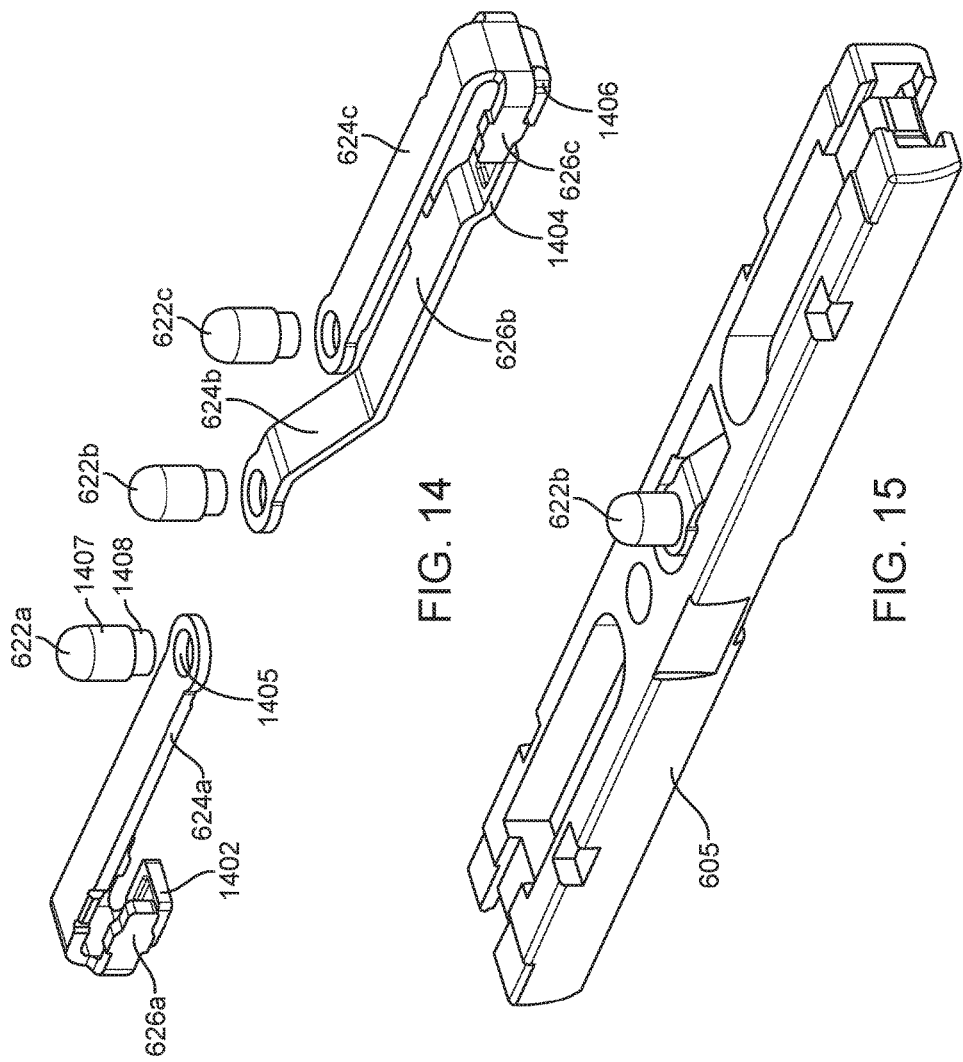

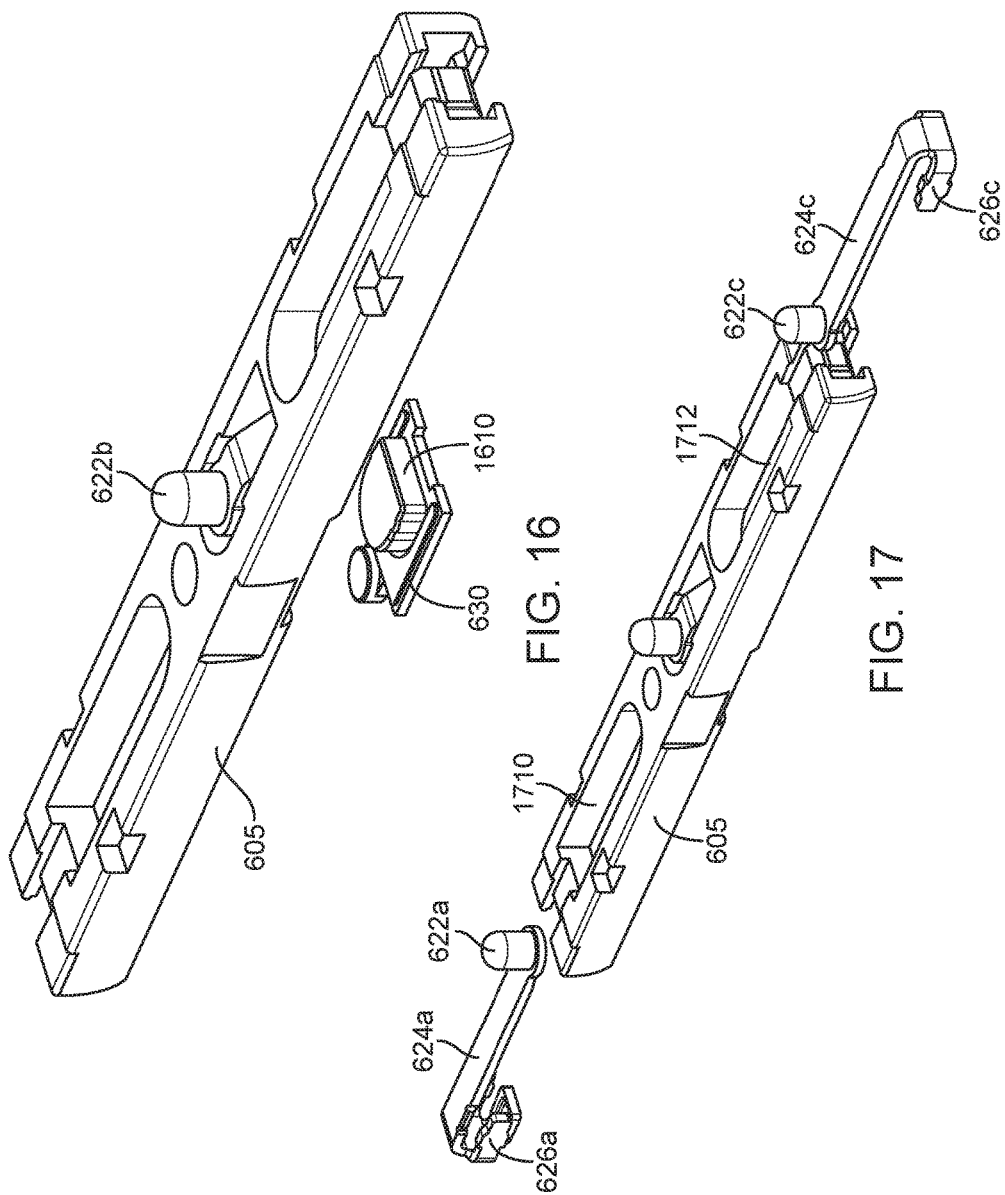

ELECTRONIC DEVICE WITH MOVEABLE CONTACTS AT AN EXTERIOR SURFACE

CROSS-REFERENCES TO RELATED APPLICATIONS

This application is a Continuation of U.S. patent application Ser. No. 15/256,470, for "ELECTRONIC DEVICE WITH MOVEABLE CONTACTS AT AN EXTERIOR SURFACE" filed Sep. 2, 2016, which claims the benefit of priority of U.S. Provisional Patent Application 62/215,707 filed on Sep. 8, 2015; U.S. Provisional Patent Application 62/215,714 filed on Sep. 8, 2015; U.S. Provisional Patent Application 62/254,033 filed on Nov. 11, 2015; U.S. Provisional Patent Application 62/215,592 filed on Sep. 8, 2015; and U.S. Provisional Patent Application 62/214,671 filed on Sep. 4, 2015; each of which is incorporated herein by reference in its entirety.

BACKGROUND

There are many different types of electronic devices including laptop computers, tablet computers, smart phones, among others. Such devices can work in cooperation with one or more accessory devices (e.g., a keyboard, a game controller, a clock radio, etc.) to expand the capabilities and functionality of the primary or host electronic device. To do so, a connection can be established between the host electronic device and the accessory electronic device.

Connections can be established with a variety of conventional physical connectors that adhere to pre-defined formats, such as USB 2.0, USB 3.0, Firewire, and the like, or connections can be established wirelessly using protocols such as Bluetooth, WiFi, etc. In some instances, a physical, wired connection can be beneficial to exchange power and exchange data.

Wired connections require some amount of real estate within the device. As an example, a USB receptacle connector typically requires a certain amount of surface area at an exterior surface of a host device along with a certain amount of volume within the host device for the cavity of the receptacle connector into which a plug connector can be inserted and for the associated contacts and circuitry of the receptacle connector. Physical connectors can also become a potential source of corrosion and may detract somewhat from the aesthetic appearance of the device.

BRIEF SUMMARY

Embodiments of the disclosure pertain to an electronic device, such as an accessory electronic device, that includes a physical connector having one or more contacts positioned at an exterior surface of the device. Each of the one or more contacts can be positioned within an opening that corresponds in size and shape to the contact such that there is essentially no gap or a minimal gap between the sides of the contact and surfaces surrounding the opening where a contacting portion of each contact protrudes out of the opening. The one or more contacts can be biased by a biasing element, such as a spring, to protrude from the opening, and are movable in a direction perpendicular to the surrounding housing such that when the contacts are mated with an appropriate connector on another device, each contact depresses slightly inward within its respective opening. The biasing element applies a sufficient normal force to the contacts to maintain a strong electrical connection between each contact and its corresponding contact in the mating connector.

In some embodiments the connector does not include an exposed cavity or other open area in which dirt or debris, such as lint, can collect. Additionally, connectors according to embodiments of the disclosure take up minimal real estate, including minimal surface area, depth and volume, on the electronic device in which they are incorporated. As such, connectors according to the disclosure can be small and barely noticeable contributing to the overall aesthetic appearance of the device.

In some embodiments, an accessory device suitable for use with an electronic device is provided. The accessory includes: an enclosure; one or more electrical components positioned within or attached to the enclosure; an attachment feature connected to the enclosure and configured to magnetically couple the accessory device with the electronic device, the attachment feature comprising: an exterior surface; a corresponding plurality of openings formed through the exterior surface; a plurality of movable contacts corresponding in number to the plurality of openings, each movable contact extending out of one of the plurality of openings; one or more biasing members operatively coupled to the plurality of movable contacts to bias the contacts such that a contacting portion of each contact protrudes beyond the exterior surface of the attachment feature through its respective opening; and an alignment feature comprising at least one magnet positioned adjacent to the plurality of openings.

In some embodiments an accessory device suitable for use with an electronic device is provided that includes: an enclosure; one or more electrical components positioned within or attached to the enclosure; an attachment feature connected to the enclosure and configured to magnetically couple the accessory device with the electronic device, the attachment feature comprising a housing and an opening formed through the housing; a contact structure positioned within the opening at an exterior surface of the attachment feature. The contact structure can include: a contact housing; a cover attached to a top of the contact housing, the cover including a raised portion sized and shaped to fit within the device housing opening; a plurality of openings formed in the cover; a plurality of movable contacts corresponding in number to the plurality of openings, each of the plurality of movable contacts having a contacting portion; and a plurality of biasing members positioned within the contact housing and corresponding in number to the plurality of contacts, each biasing member operatively coupled to one of the plurality of movable contacts to bias the contact such that the contacting portion protrudes outside of the enclosure through its respective opening. And the accessory can further include an alignment feature positioned within the housing and having first and second arrays of magnets positioned on opposing sides of the contact area.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

FIGS. 14-19 illustrate a method of assembling a contact structure according to an embodiment of the present disclosure;

DETAILED DESCRIPTION

Reference will now be made in detail to representative embodiments of the disclosure illustrated in the accompanying drawings. Although these embodiments are described in sufficient detail to enable one skilled in the art to practice the described embodiments, it is understood that these examples are not limiting. To the contrary, the present disclosure is intended to cover alternatives, modifications, and equivalents as can be included within the spirit and scope of the described embodiments. It is to be understood that other embodiments may be used and changes may be made without departing from the spirit and scope of the described embodiments.

The following disclosure relates to electronic devices, such as accessory electronic devices, that include a physical connector having one or more contacts positioned at an exterior surface of the electronic device. Each of the one or more contacts can be positioned within an opening that corresponds in size and shape to the contact such that there is essentially no gap or a minimal gap between the sides of the contact and surfaces surrounding the opening through which a contacting portion of each contact protrudes. The one or more contacts can be biased by a biasing element (for example, a spring) to protrude from the opening, and the contacts are movable such that when the contacts are mated with an appropriate connector on another device, each contact depresses slightly inward within its respective opening against the biasing member. During the mating process, the biasing element applies a sufficient normal force to the contacts to maintain a strong electrical connection between each contact and its corresponding contact in the mating connector.

In some embodiments the connector does not include an exposed cavity or other open area in which dirt or debris, such as lint, can collect. Additionally, connectors according to embodiments of the disclosure take up minimal real estate, including minimal surface area, depth and volume, on the device in which they are incorporated. As such, connectors according to the disclosure can be small and barely noticeable contributing to the overall aesthetic appearance of the device.

Figure 1:
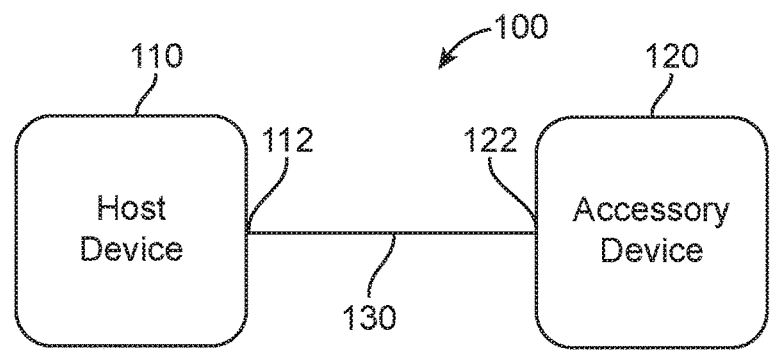
FIG. 1 illustrates an electronic system according to an embodiment of the disclosure.

FIG. 1 illustrates an electronic system 100 according to some embodiments of the present disclosure. System 100 includes a host electronic device 110 that can be connected to an accessory electronic device 120 in order to share data, power, or both between the accessory and the host. Specifically, one or more contacts 112 on host device 110 can be electrically connected to one or more contacts 122 on accessory device 120 by, for example, a cable connector 130. In other embodiments of the present disclosure, contacts 112 on host device 110 can be directly and electrically connected to contacts 122 on accessory device 120 using connectors different than cable connector 130. In still other embodiments of the present disclosure, one or more optical contacts supporting one or more optical connections between host device 110 and accessory device 120 can be included.

To facilitate a direct connection between contacts 112 on host electronic device 110 and contacts 122 on accessory electronic device 120, contacts 122 can be part of a surface mount connector incorporated into accessory device 120 that includes a housing supporting one or more movable contacts at an external surface of device 120. Each movable contact can include a contact portion that emerges from a corresponding opening in the housing. Some examples of a surface mount connector that includes contacts 122 are shown in the following figures and discussed below.

Figure 2:
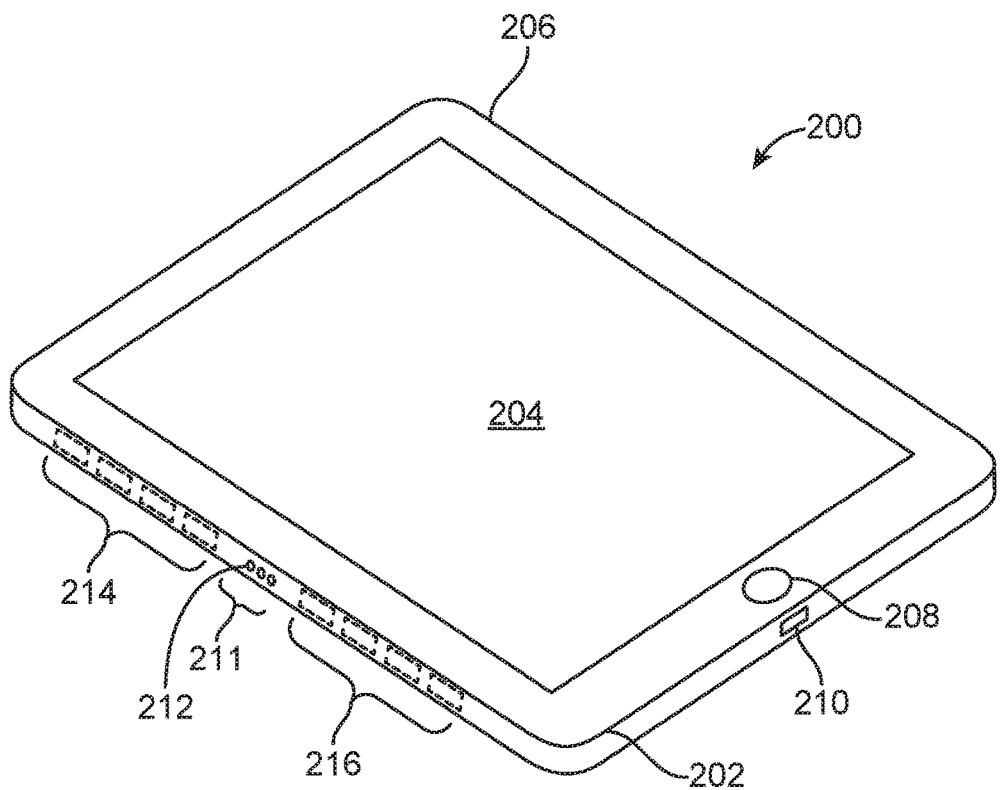
FIG. 2 is a simplified isometric view of a host electronic device shown in FIG. 1 according to some embodiments of the disclosure.

Some embodiments of the disclosure pertain to accessory electronic device 120 and contacts 122 that are incorporated within the accessory electronic device. The accessory contacts 122 are sized and shaped to mate with contacts 112 of host electronic device 110. Thus, prior to describing various embodiments of accessory electronic device 120 and accessory contacts 122 in detail, reference is made to FIG. 2, which illustrates an isometric view of an electronic device 200 that is representative of one the many different types of electronic devices that can be host electronic device 110 shown in FIG. 1. In some embodiments, electronic device 200 is a mobile communications device, such as a smartphone. In the embodiment shown in FIG. 2, electronic device 200 is a tablet computing device. Electronic device 200 can vary in shape and size. Also, electronic device 200 can include an enclosure 202 that forms a cavity and is designed to enclose and protect various internal components of device 200 within the cavity, such as a battery, one or more processors, one or more computer-readable memories, wireless interfaces, etc. In some embodiments, enclosure 202 is formed from a metal, such as aluminum, or another electrically conductive material.

Electronic device 200 can also include a display assembly 204 designed to present visual content. In some embodiments, display assembly 204 includes a touch sensitive layer designed to receive a touch input and generate commands, in accordance with the touch input, to the electronic device 200. Further, in some embodiments, display assembly 204 includes a capacitive touch sensitive layer designed to generate an input based upon a capacitive coupling with the display assembly 204. An outer protective layer 206 made from a transparent material, can overlay display assembly 204 and be attached to enclosure 202 with an adhesive or other means thereby covering the display and the cavity formed by the enclosure. Outer protective layer 206 can be made from glass or similar materials and is sometimes referred to as a cover glass. In some embodiments, electronic device 200 can further include a force detection sensor (not shown) designed to detect an amount of force applied to display assembly 204 and/or outer protective layer 206.

Electronic device 200 can include one or more input buttons, such as button 208, designed to receive an input corresponding to a command to the electronic device (for example, to change the visual content shown on display assembly 204). Further, in some embodiments, electronic device 200 includes a receptacle connector 210 designed to receive power and/or data from another device. For example, power from a power source (not shown) can be supplied to device 200 through connector 210 in order to power internal components of electronic device 200 and/or power one or more power sources (not shown) disposed in electronic device 200. Receptacle connector 210 can include a cavity in which the contacts of the receptacle connector are located.

Separate from connector 210, electronic device 200 can further include one or more electrical contacts 212 within a contact area 211 located at an exterior surface of device 200. Electrical contacts are designed to electrically couple with corresponding contacts associated with an accessory device, such as one of accessory device 400 or 500 (shown in FIGS. 4 and 5). Contacts 212 can allow for electrical communication between electronic device 200 and accessory device 400 or 500 just as contacts 112 can allow electrical communication between devices 110 and 120. For example, in some embodiments contacts 212 can include one or more data contacts that enable the exchange of data between device 200 and device 400 or 500. Contacts 212 can also include one or more power contacts that enable an accessory device to provide power to electronic device 200 or enable an accessory device to draw power from device 200 and/or ground contacts.

Contacts 212 can be substantially flush with an exterior surface of housing 202. That is, in some embodiments contacts 212 are not formed within an exposed opening or other type of cavity in housing 202 that is typically required by a receptacle connector, such as connector 210, and that might otherwise be a source for dust or other debris to collect. Instead, contacts 212 are part of a continuous exterior surface of the device housing 202 making the contacts less noticeable than when standard connectors are incorporated into housing 202, which can be beneficial to the aesthetic appearance of electronic device 200. As used herein, contacts 212 can be said to be "substantially flush" with an exterior surface of housing 202 when the exterior surface of the contacts is flush with (e.g., in the same plane as) the surrounding housing surface as well as when an exterior surface of each individual contact 212 is recessed a limited amount, such as 1 millimeter or less, from the surface of the exterior housing 202 that surrounds the contact. In other embodiments contacts 212 are recessed 0.5 mm or less and in still other embodiments, contacts 212 are recessed 0.25 mm or less from the surrounding exterior housing surface. When the contacts are substantially flush with the surrounding exterior surface of housing 202, the contact and exterior housing can combine such that there is a continuous smooth transition between the portion of the housing exterior surface surrounding the contact and the exterior surface of the contact.

Since contacts 212 are not positioned within a cavity of housing 202 or other exposed opening of housing 202 that can provide alignment for a corresponding connector to mate and electrically connect to contacts 202, in some embodiments electronic device 200 includes an alignment feature to facilitate connector mating. In some particular embodiments, the alignment feature can include a first array 214 of alignment magnets and a second array 216 of alignment magnets disposed along a sidewall of enclosure 202 on opposite sides of contacts area 211. Each of first array 214 and second array 216 of magnets can include several magnets having a magnetic polarity arrangement to magnetically couple the arrays with corresponding arrays of magnets in the accessory electronic device as explained below. The magnetic circuits formed by multiple magnetic couplings can allow electronic device 200 to magnetically couple with an accessory electronic device, such as accessory devices 400 and 500 shown in FIGS. 4 and 5, respectively, and align contacts 212 with contacts of the accessory electronic device. In other embodiments, the alignment feature can include fewer or more magnets or magnetic components or other types of alignment structures.

Figure 3:
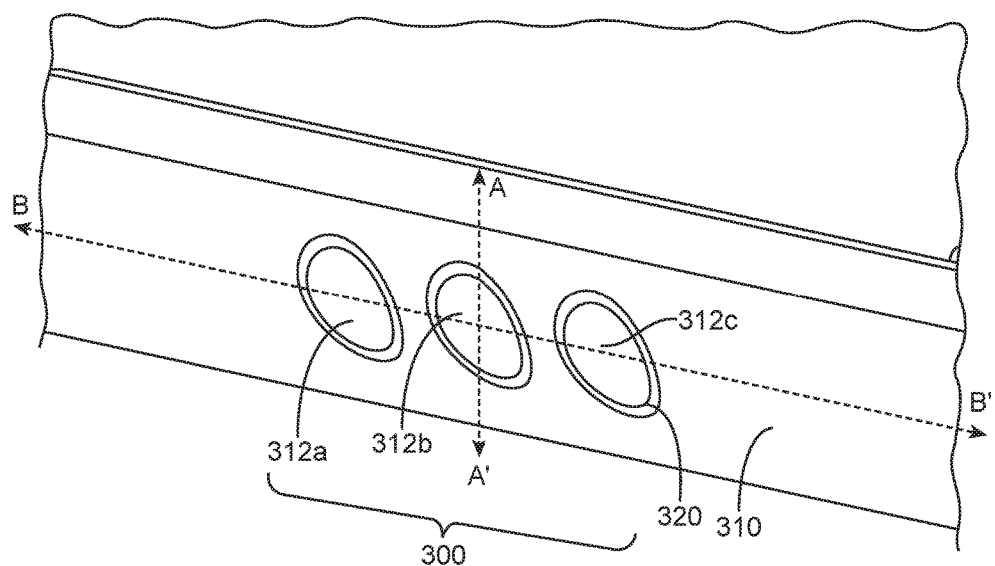
FIG. 3 illustrates a contact structure in a device enclosure according to some embodiments of the disclosure.

FIG. 3 illustrates one example of a contact area 300 in a device enclosure according to an embodiment of the present disclosure. Contact area 300 can be, for example, contact area 211 shown in FIG. 2. In this example, contact area 300 includes three individual contacts 312 (labeled as contacts 312a, 312b and 312c) each of which is located at and substantially flush with a surrounding exterior surface of a device enclosure 310. Embodiments of the disclosure are not limited to any particular number of contacts, however, and other embodiments can include fewer or more than three contacts within contact area 300. Each of contacts 312 can be similar to or identical to contacts 212 while device enclosure 310 can be, for example, housing 202 of electronic device 200.

In some embodiments device enclosure 310 can be made from a metal or similar electrically conductive material in which case an insulating ring 320 can surround an outside edge of each individual contact 312 between each contact 312 and device enclosure 310. The insulating rings 320 can be made from plastic or another nonconductive material and can electrically isolate contacts 312 from device enclosure 310. In these and other embodiments of the present disclosure, contacts 312 and insulating rings 320 can be substantially flush with a surrounding surface of device enclosure 310.

In some embodiments, each contact 312 is positioned within and fills an opening in device enclosure 310 with an insulating ring 320 located between its respective contact 312 and the portion of device enclosure 310 surrounding the contact. The insulating ring 320 can closely abut both device enclosure 310 and contact 312 such that no gaps are formed between the three components. Further, as evident from the figure, the exterior surface of the electronic device within contact area 300 (including the relevant portions of enclosure 310, contacts 312 and insulating rings 320) can essentially be a continuous, smooth (to a user's touch) surface along lines A-A' and B-B'. Additionally, the exterior surfaces of enclosure 310, each contact 312 and each insulating ring 320 can be curved, they can be substantially flat, or they can have other contours. In some embodiments the exterior surfaces of contacts 312 and surrounding insulating rings 320 can combine such that, when the contacts and insulating ring are recessed a limited amount as described herein, the exterior surfaces of the contact, insulating ring and device housing all combine to form a continuous smooth exterior surface that can be slightly recessed in the areas of the contact and/or insulating ring, forming three side-by-side dimples in the contact area as shown in FIG. 3.

Figure 4A:
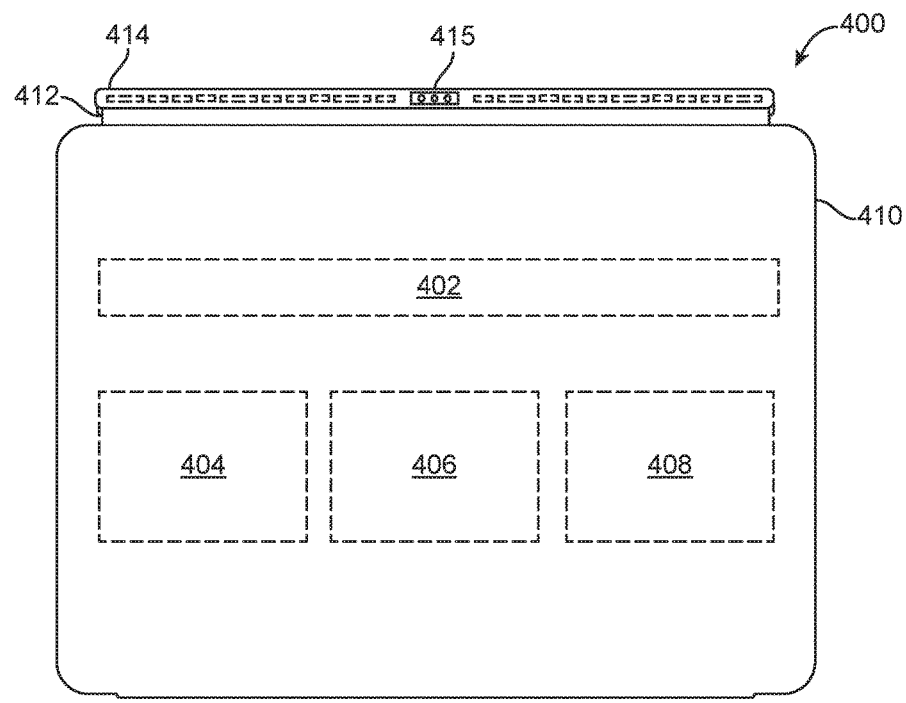
FIG. 4A is a simplified top plan view of an accessory electronic device that includes multiple contacts that can be mated with the contact structure shown in FIG. 3 according to some embodiments of the disclosure.

FIG. 4A illustrates a top plan view of an accessory electronic device 400 that is representative of one the many different types of electronic devices that can be accessory electronic device 120 shown in FIG. 1. Accessory electronic device 400 can include one or more electrical components, such as components 402, 404, 406 and 408 that can be electrically coupled to a host electronic device, such as one of host devices 110 or 200, via a surface mount connector 415, which can include one or more contacts, such as contacts 122. Components 402-408 can be housed within, positioned at an exterior surface of, or otherwise connected to, an enclosure 410. In some embodiments, such as those discussed with respect to FIG. 5, enclosure 410 can be a cover sized and shaped to overlay and cover another electronic device, such as device 200. In some embodiments where enclosure is a cover, the one or more of components 402-408 can be embedded within the cover. Alternatively, or in addition to such, one or more of components 402-408 can be attached to the cover (for example, as keyboard assembly 504 is attached to cover 502 in the embodiment discussed in conjunction with FIG. 5) or positioned on the cover.

Components 402-408 can be any of a wide variety of electrical components such as a computer-readable memory, a processor, a display, a keyboard, a touch pad, input buttons, a battery and/or any of a variety of different sensors, such as force sensors, biometric sensors, temperature sensors, light sensors, proximity sensors and/or accelerometers to name a few. The one or more components 402-408 can be incorporated into accessory 400 enabling the accessory, which can communicate with a host electronic device, via surface mount connector 415, to augment or expand the capabilities or functionality of the host electronic device to which it is connected.

In the embodiment shown in FIG. 4, accessory electronic device 400 further includes an attachment feature 414 that is connected to enclosure 410 by a flexible member 412. Attachment feature 414 enables accessory electronic device 400 to be operatively attached to a host electronic device, such as device 200. Flexible member 412 enables the attachment feature to rotate with respect to enclosure 410 around an axis that is parallel to a length of the attachment feature. Such rotation enables the attachment feature, and surface mount connector 415 that is incorporated into the attachment feature, to be positioned at many different angles with respect to enclosure 410 providing a variety of attachment positions between accessory device 400 and the host device to which connector 415 is to be mated. In other embodiments, attachment feature 414 can be part of enclosure 410 and can be included at an exterior surface of the enclosure. For example, in some embodiments attachment feature 414 can be in a permanent fixed position with respect to other portions of enclosure 410. In other embodiments, attachment feature 414 can be connected to enclosure 410 by a hinge or other rigid element that allows the attachment feature to be moved into different positions relative to the enclosure.

Attachment device 414 can include one or more magnets for aligning and securing surface mount connector 415 to the corresponding connector of another electronic device. For example, as shown in FIG. 4A, attachment feature 414 includes a first array of magnets 420 on one side of connector 415 and a second arrays of magnets 422 on the opposing side. First and second arrays of magnets 420, 422 can be aligned to magnetically couple to corresponding arrays of magnets disposed in the host electronic device to accessory device 500 is to be attached. For example, when accessory device 400 is designed to be operatively attached to host electronic device 200, first array of magnets 420 can align with and magnetically couple to first array 214 of alignment magnets in device 200 while second array of magnets 422 can align with and magnetically couple to second array 216 of alignment magnets in device 200. Attachment feature 414 includes an enclosure (not shown) in which the first and second arrays of magnets, along with other components, can be housed.

Figure 4B:
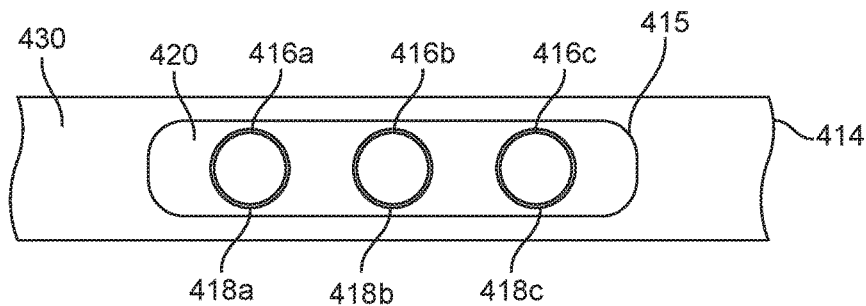
FIG. 4B is a simplified top plan view of the contact structure shown in FIG. 4A according to some embodiments of the disclosure.
Figure 4C:
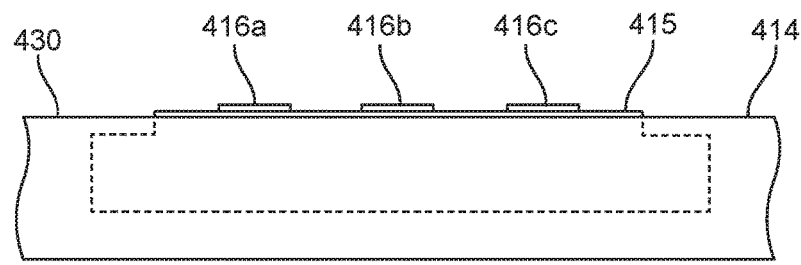
FIG. 4C is a simplified side plan view of the contact structure shown in FIG. 4B.
Figure 4D:
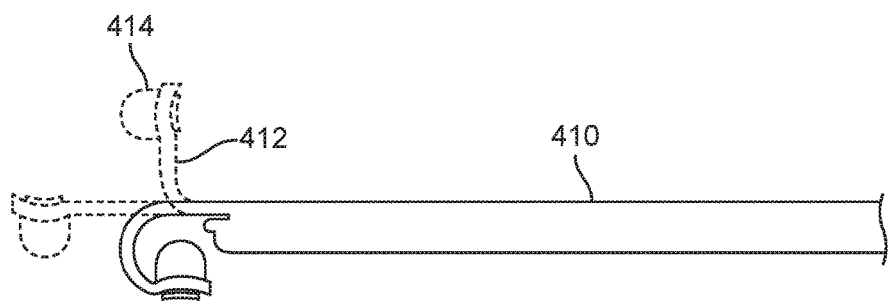
FIG. 4D is a simplified side plan view of a portion of the accessory electronic device shown in FIG. 4A according to some embodiments of the disclosure.

FIG. 4B illustrates a top view of surface mount connector 415 while FIG. 4C illustrates a side plan view. As shown in these figures, connector 415 can include one or more electrical contacts designed to electrically couple with electrical contacts of a host electronic device, such contacts 312 of host device 200. Generally the number of electrical contacts in connector 415 will equal the number of contacts in the corresponding contact area 300 that accessory 400 is manufactured to be paired with. In some embodiments, for example as shown in FIGS. 4B and 4C, surface mount connector 415 includes three contacts 416a, 416b, and 416c that align with and can be electrically coupled to contacts 312a, 312b, 312c, respectively. Embodiments of the disclosure are not limited to any particular number of contacts within connector 415, however, and can include more or fewer than three contacts in various embodiments.

Surface mount connector 415, or a portion thereof, can fit within an opening (not labeled) of the enclosure portion of attachment feature 414 such that there is essentially no gap between a top surface 420 of connector 415 and an exterior surface 430 of attachment feature 414 that surrounds the exposed portion of the surface mount connector. In some embodiments, exterior surface 430 and top surface 420 can be part of a continuous flush exterior surface of electronic device 400, while in other embodiments top surface 420 is raised a small distance (less than 1 mm in some embodiments, less than 0.5 mm in other embodiments) above surrounding surface 430.

Surface mount connector 415 can include multiple openings 418a-418c that correspond in number to the number of contacts within the connector. Thus, as shown in FIG. 4B, each contact 416a-416c sits within its respective opening 418a-418c. A very narrow, almost imperceptible gap can exist between each contact and an inner surface of the surface mount connector that defines the contact's respective opening. As shown in FIGS. 4B and 4C, each opening 418a-418c can be formed in top surface 420. In other embodiments the openings 418a-418c can be formed directly in surface 430. In some embodiments of the disclosure the openings are in a surface that is in the same plane as the surrounding exterior surfaces of device 400 or is slightly raised from the surrounding surfaces as described above. Thus, in such embodiments, no portion of the exterior surfaces of device 400 that surround the openings in the X or Y planes is above the openings in the Z plane and the openings 418-418c can be said to be formed in a surface that is substantially flush with the surrounding exterior surfaces.

Further, as shown in FIG. 4C, the contacts 416a-416c can be low-profile contacts that protrude slightly above the top of the opening and thus protrude slightly above the surrounding exterior surfaces of attachment feature 414. In some embodiments, contacts 416a-416c protrude less than 1 mm above the surface of attachment feature 414. In still other embodiments, the contacts protrude 0.5 mm or less above the surface of attachment feature 414, and in still other embodiments, the contacts protrude 0.25 mm or less above the surface of the attachment feature.

Attachment feature 414 can be connected to the bulk of enclosure 410 by a flexible connector 412. Flexible connector 412 can be, for example, one or more layers of flexible material such as a polymer-based, low modulus elastomeric material that allows attachment feature 414 to be positioned at different angles with respect to enclosure 410. For example, as shown in FIG. 4C, flexible connector 412 allows attachment feature (and thus contact structure 415) to be moved between a first position in which attachment feature faces parallel to device 400, a second position in which attachment feature 414 faces perpendicularly and up from device 400, and a third position in which attachment feature 414 faces perpendicularly and down from device 400. Connector 412 also allows the attachment feature to be positioned at any angle in between the three positions shown in FIG. 4C as well as at additional angles.

Figure 5:
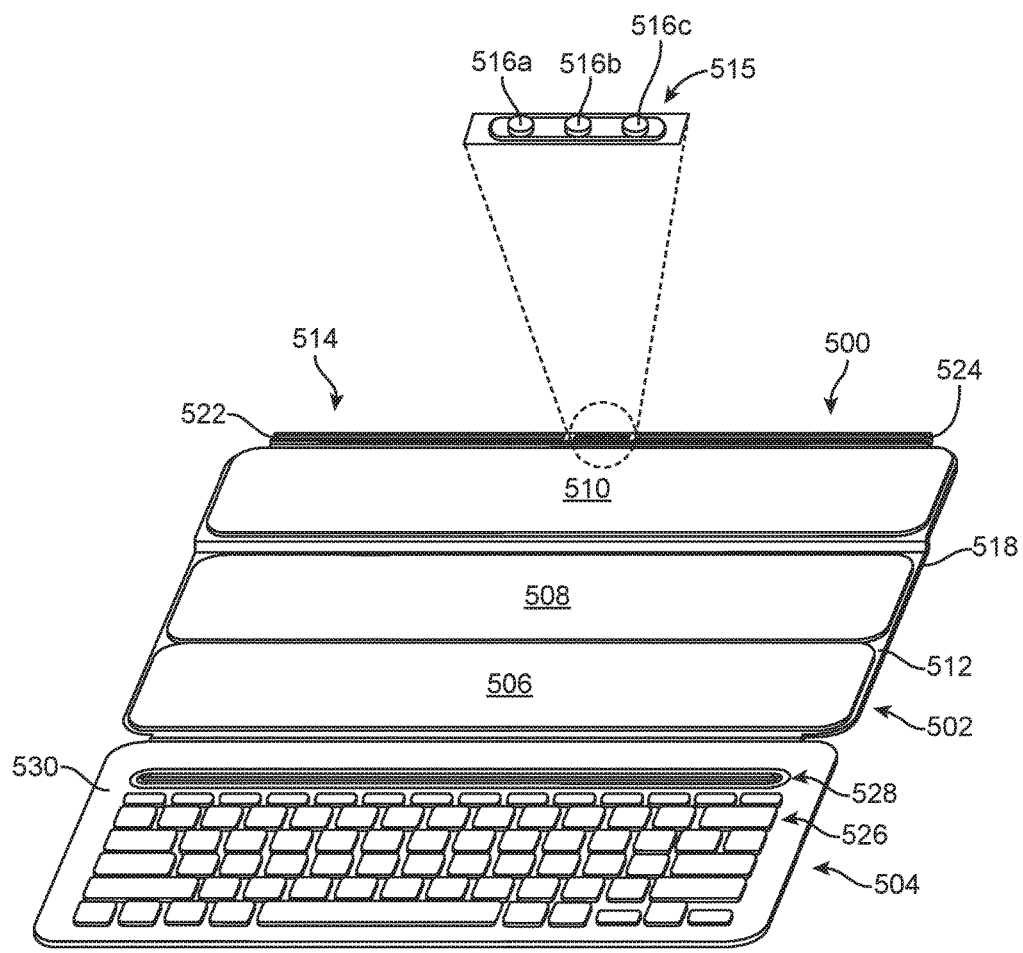
FIG. 5 is a simplified isometric view of an accessory electronic device having a keyboard attached to a cover that includes multiple contacts that can mate with the contact structure shown in FIG. 3 according to some embodiments of the disclosure.

Reference is now made to FIG. 5, which illustrates an isometric view of an embodiment of an electronic device that is representative of accessory electronic device 120 and accessory electronic device 400. As such, electronic device 500 can be electrically connected to and physically attached to a host electronic, such as host electronic device 110 shown in FIG. 1 or host electronic device 200 shown in FIG. 2. Accessory device 500 includes a cover 502 coupled with a keyboard assembly 504. Cover 502 can be sized and shaped to overlay and cover an electronic device, such as device 110 or device 200, that can be used with accessory device 500. In some embodiments, cover 502 includes multiple sections, which can also be referred to as panels or segments. For example, as shown in FIG. 5, cover 502 can include a first segment 506, a second segment 508, and a third segment 510. Each of first segment 506, second segment 508, and third segment 510 can be moveable or rotatable with respect to the remaining segment. In this regard, cover 502 may be referred to as a foldable cover. Further, as shown in FIG. 5, third segment 510 can be raised or elevated with respect to first segment 506 and second segment 508 such that when the keyboard assembly 504 is folded over and onto first segment 506 and second segment 508, keyboard assembly 504 is generally co-planar, or flush, with respect to third segment 510.

Each of the first, second and third segments can be covered or overlaid by a fabric layer 512, such as a microfiber, or generally any material that provides a cosmetic enhancement while also not causing damage to a display assembly (e.g., display 204 shown in FIG. 2) of the host electronic device that accessory keyboard 500 is designed to operate with. Also, each of the segments can include a rigid panel formed from a material, such as glass fiber, disposed below fabric layer 512. Further, the segments previously described can be folded to define a folded configuration of cover 502 in which the electronic device that the accessory keyboard is designed to cooperate with can be positioned in a propped-up position.

Cover 502 can further include an attachment feature 514, similar to attachment feature 414 described above and designed to receive and secure a host electronic device, such as host electronic device 110 or host electronic device 200, with accessory device 500. In this regard, attachment feature 514 can include one or more magnets, or arrays of magnets, (not shown in FIG. 5) that can be aligned to magnetically couple to several magnets disposed in the host electronic device to accessory device 500 is to be attached as described above. Further, accessory device 500 can include one or more electrical contacts within an accessory contact structure 515 designed to electrically couple with electrical contacts 312 of a host electronic device, such as host device 110 or 200, as also described above. Accessory contact structure 515 can be, for example, surface mount connector 415 described with respect to FIG. 4. Further details of an embodiment of accessory contact structure 515 are also discussed later in this application with respect to at least FIGS. 6-7 and 14-25.

Attachment feature 514 can be coupled with cover 502 by way of an exterior layer 518, or outer layer, that extends along an exterior surface of cover 502 and wraps around the attachment feature 514 to define a top, or upper, surface of attachment feature 514. In some embodiments, exterior layer 518 includes a polymer-based, low modulus elastomeric material that allows some flexibility of attachment feature 514 and cover 502. Further, exterior layer 518 can include a mixture of polyurethane and coal tar and can come in a variety of colors. Also, the material forming exterior layer 518 can further include relatively high adhesion to other components and can further be abrasion-resistant. In this regard, exterior layer 518 can include a relatively high coefficient of friction, which can limit movement of the electronic device when engaged with attachment feature 514. In order to lower the coefficient of friction, attachment feature 514 can include a first layer 522 and a second layer 524 surrounding the electrical contact. First layer 522 and second layer 524 can include a lower coefficient of friction relative to attachment feature 514, which can facilitate alignment and coupling between an electronic device and attachment feature 514.

Keyboard assembly 504 can include keys 526 disposed according to a QWERTY configuration commonly known in the art for a keyboard. However, in other embodiments, the keys 526 can include a different configuration according to a language or dialect. Keyboard assembly 504 can include a printed circuit board (not shown) that receives the keys 526. Keyboard assembly 504 can further include a retention feature 528 disposed across, and protruding from, a top surface 530 of the keyboard assembly 504. Retention feature 528 can be designed to receive attachment feature 514, or at least a portion of attachment feature 514, when cover 502 is in a particular folded configuration. Retention feature 528 can provide a mechanical stop for attachment feature 514 and an electronic device secured with attachment feature 514.

As shown in FIG. 5, retention feature 528 includes a ring-like configuration protruding from a top surface 530. However, in other embodiments, retention feature 528 includes two or more discontinuous features that provide the mechanical stop previously described. Still, in other embodiments, top surface 530 include a trough or "valley" in a location within retention feature 528 that positions a portion of attachment feature 514 below top surface 530. Also, retention feature 528 can include an array of magnets designed to magnetically couple with magnets in attachment feature 514 that combines with the mechanical stop to further limit movement of attachment feature 514. Further details of attachment feature 514 are discussed below with respect to FIGS. 8-9.

Figure 6:
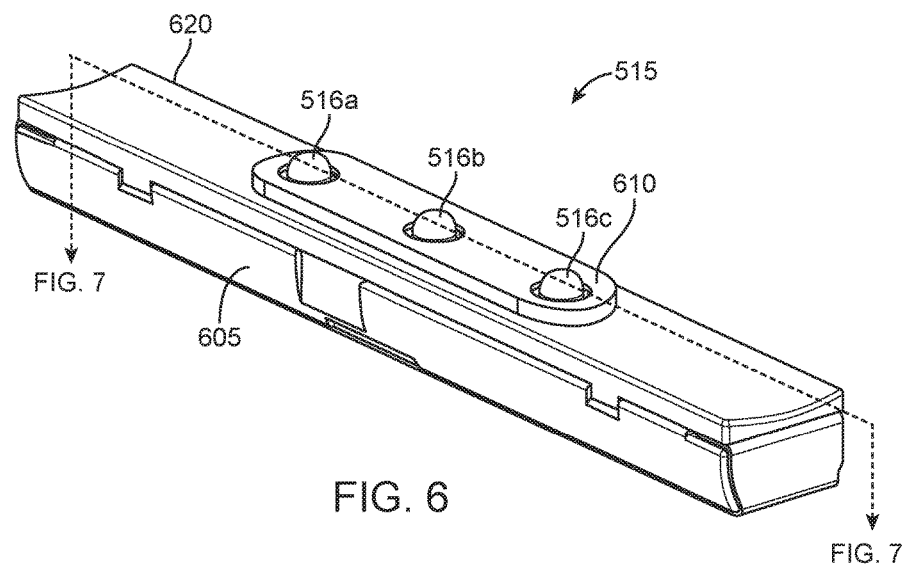
FIG. 6 is a simplified perspective view of the contact structure shown in FIG. 5 according to some embodiments of the disclosure.

Reference is now made to FIG. 6, which is a simplified perspective view of accessory contact structure 515 according to some embodiments of the disclosure. As shown in FIG. 6, contact structure 515 can include a contact housing 605 (also shown in FIG. 7) that includes a raised portion 610. The raised portion 610 is sized and shaped to be positioned within and extend through an opening in a device enclosure, such as enclosure 625 shown in FIG. 7, which can be part of the housing of the accessory device or can be, for example, an exterior surface of attachment feature 514. In this example, accessory contact structure 515 includes three individual contacts 516a, 516b and 516c, each of which can be made from metal or another conductive material. The raised portion 610 of the contact structure can include separate openings for each of the individual contacts 516a, 516b and 516c. While FIG. 6 illustrates that each of the contacts 516a-516c are located in a single raised portion 610, in other embodiments of the disclosure, more than one raised portion 610 can be employed, and one or more contacts 516a-516c can be located in portions of contact structure 515 other than the one or more raised portions 610. Also, while the three contacts 516a-516c are shown as being in spaced apart from each other in a single row or line, in other embodiments of the disclosure, the contacts of contact structure 515 can be arranged in other patterns.

Contacts 516a-516c can be low-profile contacts that allow contact structure 515 to provide contacts for a connector without consuming a large volume in the electronic device. In various embodiments, contacts 516a-516c are movable towards the accessory electronic device and can be, for example, spring-biased contacts. For example, contacts 516a-516c can be biased by a spring, flexible arm, or other flexible structure such that they can be pushed or depressed and may return to their original position once released. Spring-biased contacts can provide an amount of compliance with contacts in a corresponding connector, thereby assisting in forming electrical connections between multiple contacts 516a-516c and corresponding contacts of a second connector on a second device, such as contacts 312a-312c of host electronic device 200.

Figure 7:
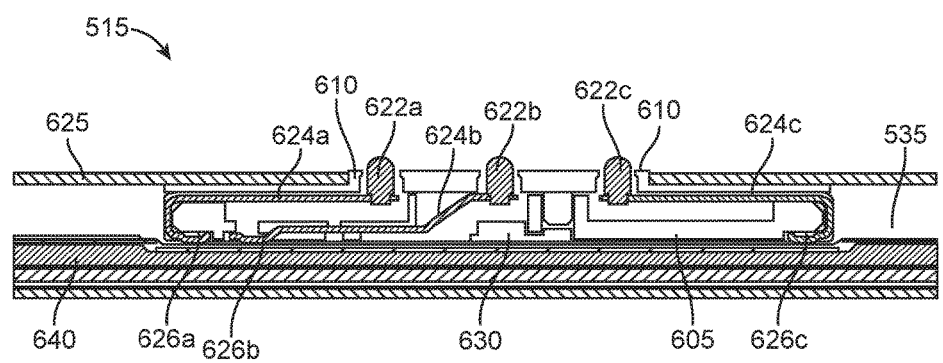
FIG. 7 is a simplified a side cross-sectional view of the contact structure shown in FIG. 6 according to some embodiments of the disclosure.

FIG. 7 is a simplified side cross-sectional view of contact structure 515 according some embodiments of the present disclosure taken along the dotted plane, shown in FIG. 6. In the described embodiment, contact structure 515 can be located within a housing or enclosure 625 of attachment feature 514. In other embodiments, contact structure 515 can be located within a portion of a housing or enclosure of an accessory electronic device different from the described attachment feature. As noted above, raised portion 610 of cover 620 of contact structure 515 can be located in an opening in device enclosure 625. Contact housing 605 of contact structure 515 can support contacts 516a, 516b, 516c (e.g., opening 548 shown in FIG. 8) having contacting portions 622a, 622b, and 622c, respectively. These contacting portions 622a-622c can be attached to ends of flexible lever arms 624a, 624b, and 624c, respectively. Each flexible arm may terminate in a second end and can include a barb, which may be inserted into notches or grooves in contact housing 605. Specifically, flexible lever arm 624a can include barb 626a, flexible lever arm 624b can include barb 626b, and flexible lever arm 624c can include barb 626c. In some embodiments, the center contact can have contact housing 605 insert molded around it and barb 626b may not be needed.

During assembly, the central contact including contact portion 622b can be inserted through an opening in a bottom of connector housing 605. Without more, contacting portion 622b could be pushed deep into connector housing 605. In some instances, contacting structure 622b could be pushed below a top surface of raised portion 610. If contacting portion 622b were to be laterally offset at this time, contacting portion 622b may not emerge from its opening in contact housing 605. Accordingly, a bottom stop portion 630 can be located under contacting portion 622b. Bottom stop portion 630 can limit a depth to which contacting portion 622b can be depressed, thereby preventing possible damage to contact structure 515. In other embodiments, the center contact can have contact housing 605 insert molded around it and bottom stop portion 630 may not be needed.

Various techniques of forming contact structure 515 are described below with respect to FIGS. 14-19. Additionally, other embodiments of contact structures according to the present disclosure are also described with respect to FIGS. 20-25.

Figure 8:
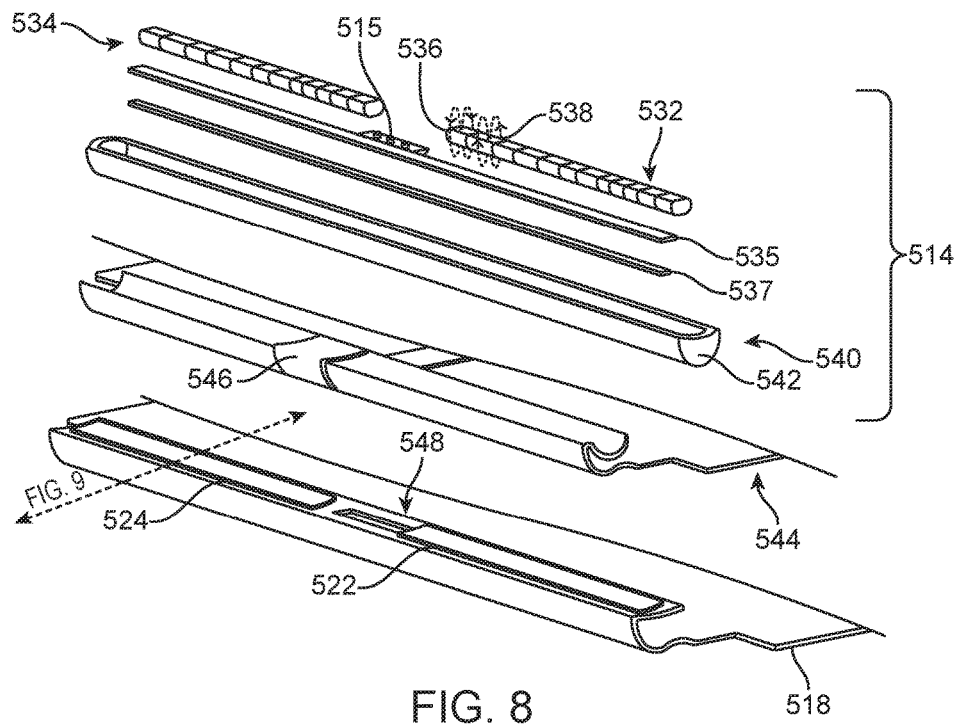
FIG. 8 illustrates an exploded view of various components of the attachment feature shown in FIG. 2 according to some embodiments of the disclosure.

Before discussing further details and embodiments of various contact structures according of the present disclosure, however, reference is now made to FIG. 8, which illustrates an exploded view of various components of attachment feature 514 according to some embodiments of the disclosure. For example, attachment feature 514 can include a first array 532 of magnets and a second array 534 of magnets. In some embodiments, first array 532 and second array 534 include several magnets (such as neodymium magnets) aligned together prior to assembly. In the embodiment shown in FIG. 8, first array 532 and second array 534 are formed form a composition of non-magnetized material and magnetized prior to an assembly of attachment feature 514. First array 532 and second array 534 can be placed under a camera/sensor assembly (not shown) and aligned with a magnetizer (not shown) according to a desired alignment between electrical contacts 516a-c and an electronic device (not shown). This allows for a custom magnetization that improves a magnetic alignment of an electronic device.

FIG. 8 further shows first array 532 and second array 534 having several magnetized regions. For example, first array 532 can include a first magnetized region 536 and a second magnetized region 538 adjacent to first magnetized region 136. Also, the magnetized regions can include dissimilar magnetic regions, or magnetic region of different sizes. As known by one of ordinary skill in the art, a magnet generally includes magnetic polarity arrangement having a "North" facing polarity, or North Pole, and a region of a "South" facing polarity, or South Pole, with magnetic field lines extending in a direction from the North Pole to the South Pole. Also, it is also understood by one of ordinary skill in the art that a North Pole of a magnet can be magnetically attracted to a South Pole of a magnet, and that two North poles, or two South poles, can magnetically repel one another. In this regard, adjacent magnetic regions of first array 532 and second array 534 can include magnet polarity arrangements designed to produce magnetic field lines in opposite directions. For example, as shown in FIG. 8, first magnetized region 536 includes magnetic field lines (shown as dotted lines) extending in a first direction, indicative of a top surface have a North polarity and a bottom surface (not shown) opposite the top surface having a South polarity. Conversely, second magnetized region 538 includes magnetic field lines (shown as dotted lines) extending in a second direction opposite the first direction, indicative of a top surface have a South polarity and a bottom surface (not shown) opposite the top surface having a North polarity. This pattern can be representative of magnetized regions of first array and the second array. Further, in other embodiments, the pattern is reversed such that first magnetized region 536 and second magnetized region 538 include magnetic field lines in the opposite direction as those shown in FIG. 8. Also, first magnetized region 536 can be smaller than that of second magnetized region 538. Similar, but complementary, magnet polarity arrangements can be employed in magnet arrays 214 and 216 of device 200 to facilitate magnet coupling of the attachment feature to device 200.

Also, as shown in FIG. 8, electrical contact structure 515 can be disposed on a flexible circuit assembly 535, and a magnetic shunt 537 can be disposed below first array 532 and second array 534. Magnetic shunt 537 can be formed from a metal, including soft steel, magnetically attracted to first array 532 and second array 534. Also, magnetic shunt 537 can alter the direction of the magnetic fields of the first and second arrays in a direction towards magnets in a host electronic device, such as magnet arrays 214 and 216 in electronic device 200, to which attachment feature secures accessory 500. Attachment feature 514 can further include a protective component 540 that include a metal layer (not shown) that can include stainless steel. An outer coating 542 can cover the metal layer and provide an aesthetic finish. In some embodiments, outer coating 542 includes a photothermolplastic ("PTP") material that includes polyurethane plus a thermoplastic.

Attachment feature 514 can further include or receive several additional features. For example, an electrically conductive fabric 544 designed to carry electrical signals from an electronic device to a connector (not shown) of keyboard assembly 504 (shown in FIG. 5), or vice versa. Electrically conductive fabric 544 can wrap around protective component 540 electrically couple with flexible circuit assembly 535, and electrically conductive fabric 544 can be electrically coupled with one or more of the individual electrical contacts 516 within contact structure 515 (i.e., one or more of contacts 516a-516c). In some embodiments, electrically conductive fabric 544 is electrically conductive throughout (the electrically conductive fabric 544). In the embodiment shown in FIG. 8, electrically conductive fabric 544 includes an electrically conductive region 546 that includes three electrically independent signal traces (not shown) that electrically couple to respective ones of contacts 516a-516c. Exterior layer 518 can also wrap around attachment feature 514 and combine with first layer 522 and second layer 524 to define a top surface of the attachment feature. As shown, exterior layer 518 can include an opening 548 that allows the raised portion 610 of contact structure 515 to protrude through couple with an electrical contact of an electronic device.

Figure 9:
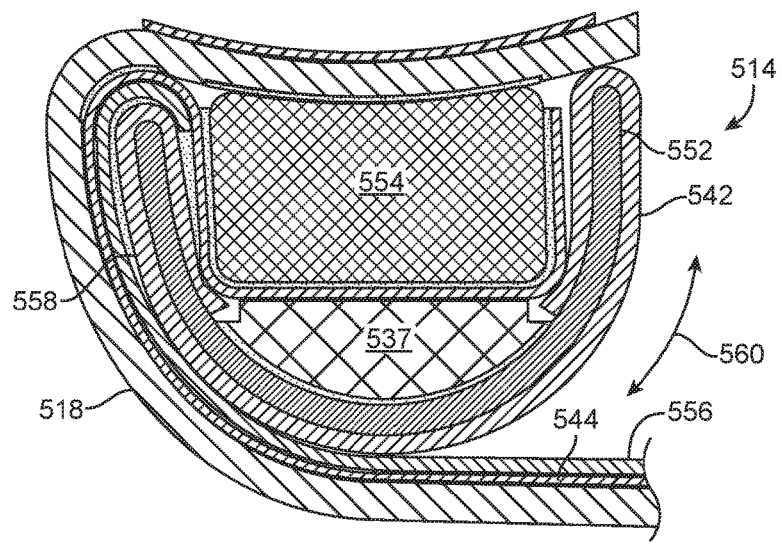
FIG. 9 illustrates a cross sectional view of the attachment feature shown in FIGS. 2 and 8 through the dashed line shown in FIG. 8.

FIG. 9 illustrates a cross-sectional view of attachment feature 514 through the dashed line shown in FIG. 8 and with the various components shown in FIG. 8 assembled together. As shown, metal layer 552, surrounded by outer coating 542, is generally U-shaped, but can vary according to a desired shape of attachment feature 514. Also, exterior layer 518 and electrically conductive fabric 544 generally wrap around protective component 540, with exterior layer 518 extending over a magnet 554 (of either first array 532 or second array 534, shown in FIG. 8) and electrically conductive fabric 544 extending below magnet 554, between magnet 554 and magnetic shunt 537. Also, electrically conductive fabric 544 can be covered by a cosmetic layer 556, which further provides a protective cover to the electrically conductive fabric 544. The cosmetic layer 556 can include PTP.

Also, cosmetic layer 556 can be adhesively secured with an upper portion of attachment feature 514. For example, an adhesive layer 558 between cosmetic layer 556 and outer coating 542 can extend only along a fraction (less than half) of outer coating 542. This allows for better ease of movement of the attachment feature in a clockwise and/or counterclockwise manner (denoted by arrow 560). Also, although not specifically shown, several features shown and described in FIG. 9 can be adhesively secured together.

Figure 10:
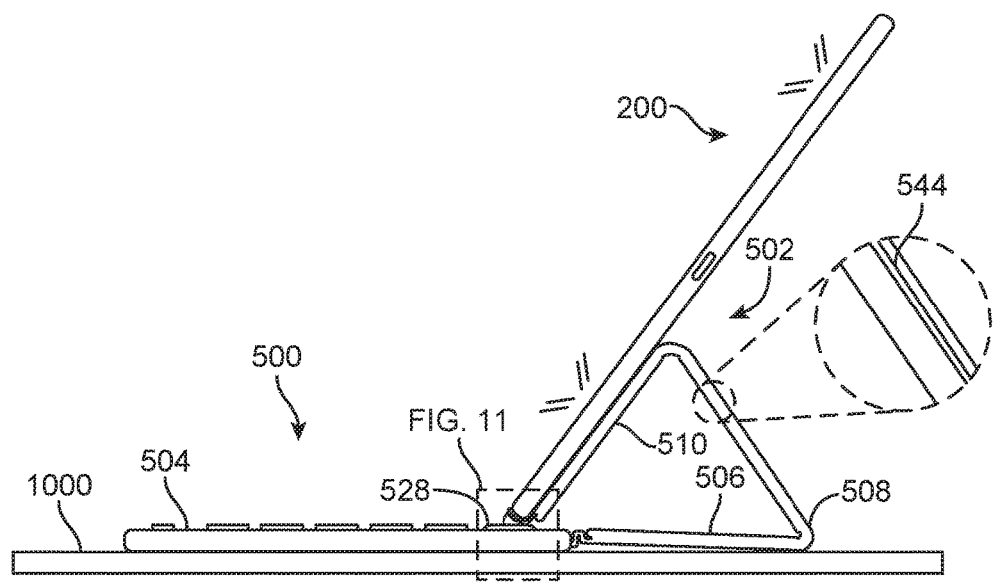
FIG. 10 illustrates a side view of the accessory device shown in FIG. 5 coupled with the electronic device shown in FIG. 2, with the accessory device in a folded configuration to allow use of the keyboard assembly with the electronic device.

Referring now to FIG. 10, which illustrates a side view of accessory device 500 resting on a surface 1000 (e.g., a desktop) and coupled with electronic device 200. As shown in FIG. 5, accessory device 500 is in a folded configuration to allow use of keyboard assembly 504 with electronic device 200. In the folded configuration, attachment feature 514 of accessory device 500 couples cover 502 to the retention feature 128 portion of keyboard assembly 504. At the same time, attachment feature 514 also couples accessory device 500 to host electronic device 200 such that contact area 300 in host device 200 is mated with and electrically connected to contact structure 515 in accessory device 500. As shown, the folded configuration can include first segment 506, second segment 508, and third segment 510 folded to form a triangular support for the electronic device 200. Further, the electronic device 200 can abut against third segment 510.

In the configuration shown in FIG. 10, keyboard assembly 504 can be used as an input device in order to generate input or command to electronic device 300 and change the visual content (denoted as several diagonal lines) of display assembly 204 (shown in FIG. 2) of electronic device 200. This is due in part to electrically conductive fabric 544, shown in the enlarged view, folding with cover 502, and extending through cover.

While not shown in FIG. 10, one or more arrays of magnets are disposed below retention feature 528 of keyboard assembly 504 and couple with the magnets in the first array 532 and second array 534 of attachment feature 514 when attachment feature 114 is positioned, or nearly positioned, in retention feature 128. In this regard, each magnet in first array 532 and second array 534 can include a magnetic polarity arrangement to magnetically couple with a magnet in one or more arrays of magnets (not shown) under retention feature 528. This allows retention feature 528 to simultaneously secure attachment feature 514 and electronic device 300 coupled with attachment feature 514. In some embodiments, the combined number of magnets in the one or more magnet arrays under retention feature 528 is equal to the combined number of magnets in first array 532 and second array 534.

Figure 11:
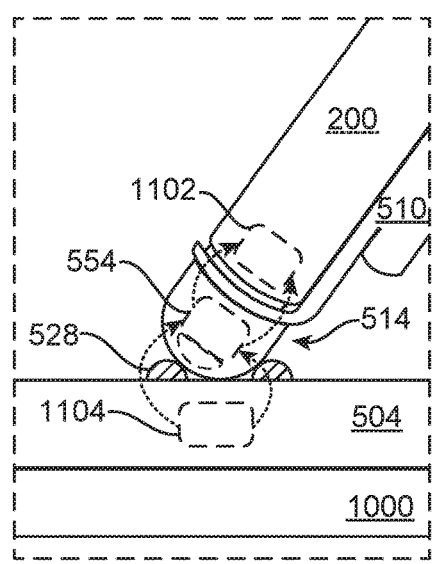
FIGS. 11-13 illustrate an enlarged view of the portion of FIG. 10 shown in dotted lines, with the attachment feature of the accessory positioned in a retention feature of the accessory.

To more clearly illustrate the magnetic coupling associated with attachment feature 514 and both retention feature 528 and electronic device 200, reference is made to FIG. 11, which illustrates an enlarged partial cross-sectional view of a portion of FIG. 10 shown in dotted lines taken through portions of attachment feature 514 and retention feature 528 that include alignment magnets as discussed. As shown in FIG. 11, attachment feature 514 is positioned in retention feature 528 and the retention feature is used as a mechanical stop for attachment feature 514. Also, as shown, attachment feature 514 can include a magnet 554 that can be part of first array 532 of magnets or second array 534 of magnets (shown in FIG. 8) magnetically coupled with a magnet 1102 that can be part of the first array 214 or the second array 216 of magnets, respectively (shown in FIG. 2). The magnetic field lines are shown as dotted lines having arrows. Magnet 554 in attachment feature 514 can further be magnetically coupled with a magnet 1104 that is part of an array of magnets in the keyboard assembly 504. This magnetic coupling can, in combination with the retention feature 528, maintain the attachment feature 514 and the electronic device 200 in a stationary position.

Figure 12:
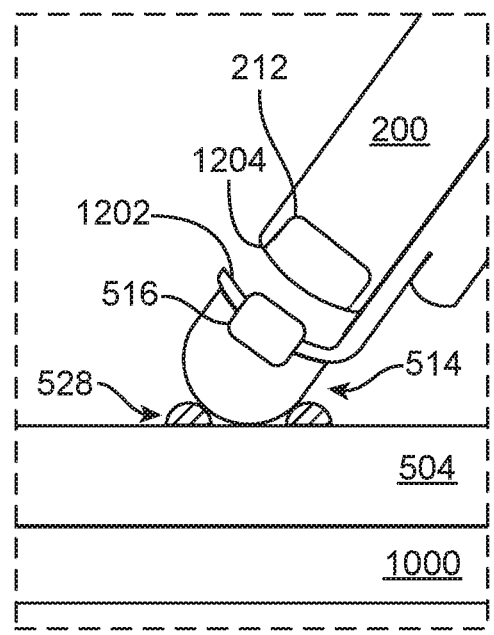
Figure 13:
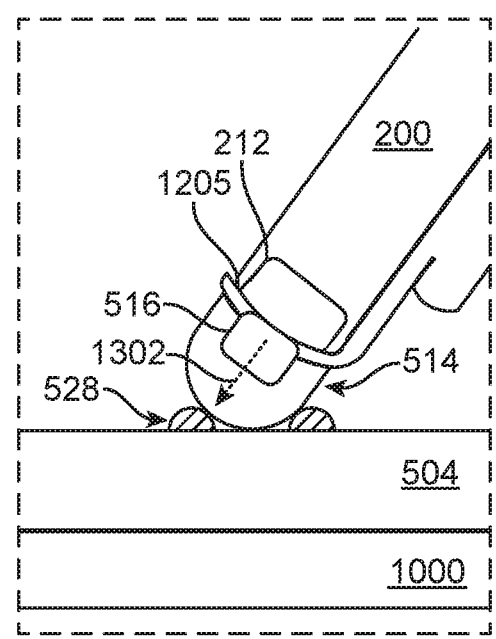

As discussed above, when accessory device is in the folded position shown in FIG. 10 such that attachment feature 514 is properly aligned with and secured within retention feature 528, each contact 516 is accessible to be electrically coupled to a respective contact 212 that is part of host device 200. This connection sequence is illustrated in FIGS. 12 and 13, each of which represents the same enlarged partial cross-sectional view of FIG. 10 that is shown in FIG. 11 but through a pair mating contacts, a contact 212 (from electronic device 200) and a contact 516 (e.g., one of contacts 516a-516c from accessory device 500) instead of through the alignment magnets. Specifically, FIG. 12 depicts host electronic device 200 in a position in which contact 212 is spaced apart from, and thus not yet mated with, contact 516. As shown in FIG. 12, contact 516 protrudes slightly above an exterior surface 1202 of attachment feature 514.

As shown in FIG. 13, as electronic device 200 is moved closer to attachment feature 514 and magnets 1102 and 554 pull device 200 into the attachment feature, contact 516 becomes physically and electrically connected to contact 212. Contact 516 is attached to a flexible lever arm (e.g., one of lever arms 624a-624c discussed with respect to FIG. 7) and is thus pushed into the enclosure 625 of the attachment feature by contact 212 (as shown by arrow 1302) until device 200 reaches its fully mated position in which exterior surface 1204 of device 200 is in physical contact with exterior surface 1202 of attachment feature 514 at an interface 1205.

Reference is now made to FIGS. 14-19, which illustrate a method of assembling a contact structure, such as contact structure 515 shown in FIG. 6, according to an embodiment of the present disclosure. In FIG. 14, contacts for a contact structure according to an embodiment of the present disclosure, such as contact structure 515, may be formed. These contacts may include contacting portions 622a, 622b, and 622c. Ends of contacting portions 622a, 622b, and 622c may be attached to flexible lever arms 624a, 624b, and 624c. Flexible lever arm 624a may terminate in a first barb 626a and include a surface-mount contact portion 1402. Flexible lever arm 624b may include barb 626b and may terminate in surface-mount contacting portion 1404. Flexible lever arm 624c may include barb 626c and may terminate in surface-mount contacting portion 1406. In other embodiments of the present disclosure, the center contact may have housing 605 insert molded around it and barb 626b may not be needed.

Contacting portions 622a, 622b, and 622bc may be riveted to flexible lever arms 624a, 624b, and 624c. Specifically, contacting portion 622a may include a narrowed tail portion 1408 below ledge 1407. Narrowed end portion 1408 may be inserted into opening 1405 in flexible lever arm 624a. Ledge 1407 may rest on a top surface of flexible lever arm 624a around opening 1405. Narrowed end 228 may have a force applied such that it widens, for example, by riveting. In this way, contacting portion 622a may be secured to flexible arm 624a by ledge 1407 and the widened portion of narrowed tail 1408. When contacting structure 515 is mounted on a board or other appropriate substrate, surface-mount contacting portions 1402, 1404, and 1406 may be soldered to contacts on the board thereby forming interconnect paths from contacting portions 622a, 622b, and 622bc to interconnect traces on the board.

In FIG. 15, a central contact including contacting portion 622a may be inserted through an opening in a bottom of housing 605. At least some of contacting portion 622a may emerge from a top surface of housing 605. In other embodiments, housing 605 may be insert molded around the central contact.

In FIG. 16, central contact 516b is shown inserted through a bottom opening in housing 605. Since central contact 622b is inserted through a bottom opening in housing 605, central contacting portion 622b could inadvertently be pushed all the way to the bottom of housing 605. To prevent this, embodiments of the present disclosure may attach a bottom stop portion 630 to a bottom of housing 605. Bottom stop portion 630 may include a raised portion 1610 below contacting portion 622b. This raised portion 1610 may restrict the travel range of contacting portion 622b. This may prevent contacting portion 622b from being pushed all the way into housing 605, thereby damaging contacting structure 515. In other embodiments of the present disclosure, the center contact may have housing 605 insert molded around it and bottom stop portion 630 may not be needed.

In FIG. 17, side contacts including contacting portions 622a and 622c may be inserted into housing 605 using slots 1710 and 1712, respectively. Flexible lever arm 624a may be pushed into housing 605 until barb 626a is inserted into a groove or notch in housing 605. Similarly, flexible lever arm 624c may be pushed into housing 605 until barb 624c is inserted into a groove or notch in housing 605.

Figure 18:
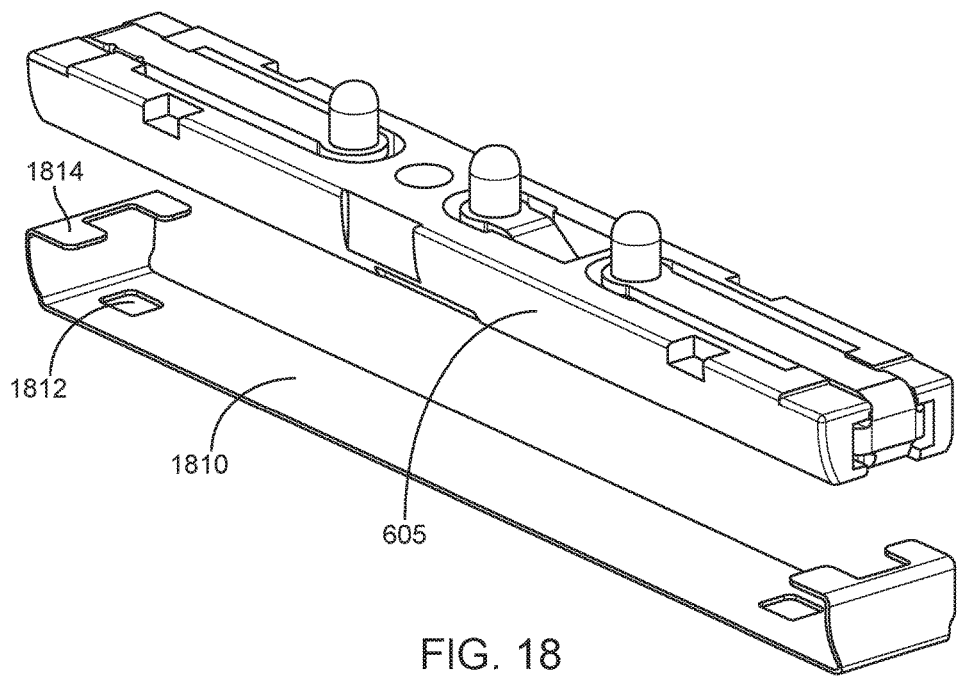

In FIG. 18, a piece of insulating tape 1810 may be wrapped around a portion of the top, sides, and bottom of housing 605. Insulating tape 1810 may include openings 1812 for surface-mount contacting portions 1402, 1404, and 1406 of the contacts in housing 605. Insulating tape 1810 may include top surface tabs 1814. Top surface tabs 1814 may be sandwiched between top cover 620 and housing 605, thereby helping to maintain insulating tape 1810 in place. In various embodiments of the present disclosure, insulating tape 1810 may be Mylar tape or other type of tape or insulating layer.

Figure 19:
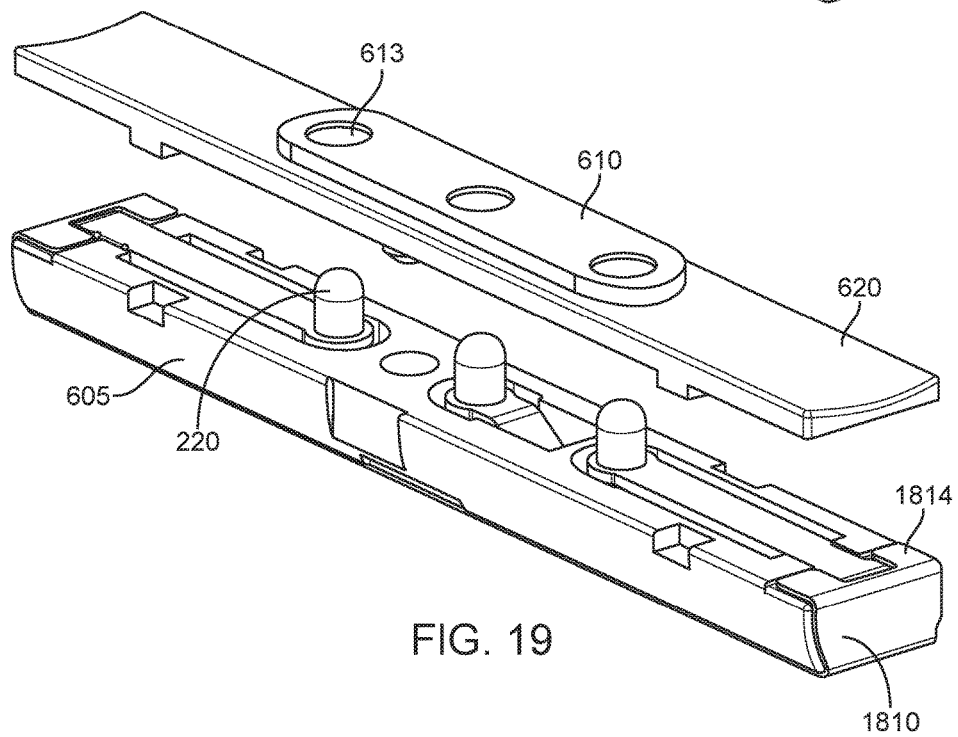

In FIG. 19, a cover 620 may be placed over housing 605. Again, top surface tabs 1814 of insulating tape 1810 may be placed between top cover 620 and housing 605, thereby holding insulating tape 1810 in place. Top cover 605 may include a raised portion 610 having three openings 613, one for each of contacts 516a-516c.

A completed contact structure 515 according to an embodiment of the present disclosure is shown in FIG. 6 and discussed above.

In various embodiments of the present disclosure, different portions of contact structure 515 and other contact structures may be formed of various materials. For example, housing 605 and cover 620 may be formed of the same or different materials, such as plastic, LPS, or other non-conductive material. Contacting portions 622*a*, 622*b*, and 622*bc*, may be formed of noncorrosive materials, such as gold, gold plated copper, gold plated nickel, gold-nickel alloy, and other materials. Flexible lever arms 624*a*, 444, and 624*c* may be formed of spring metal, sheet-metal, copper alloy, or other complaint material.

In various embodiments of the present disclosure, different portions of contact structure 515 and other contact structures may be formed in various ways. For example, housing 605 and cover 620 may be formed using injection or other molding, printing, or other technique Contact portions 622*a*, 622*b*, and 622*bc* and flexible lever arms 624*a*, 624*b*, and 624*c* may be machined, stamped, coined, forged, printed, or formed in different ways. Contact portions 622*a*, 622*b*, and 622*bc* may be attached to flexible lever arms 624*a*, 624*b*, and 624*c* by riveting, soldering, spot-welding, or other technique, or they may be formed as a single unit. Housing 605 and cover 620 may be formed around contacts 516*a*-516*c* using injection molding.

Figure 20:
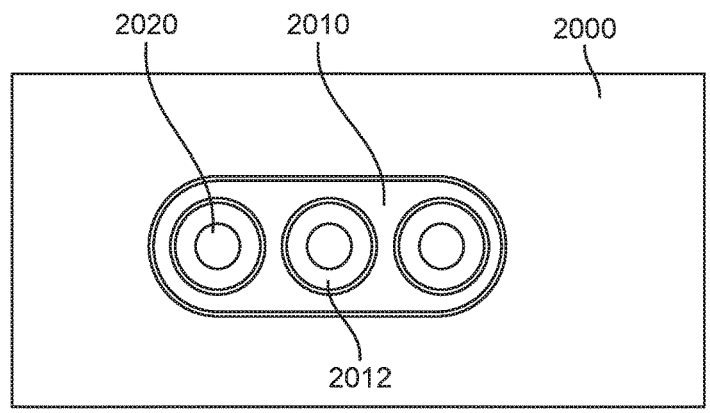
FIG. 20 illustrates another contact structure in a device enclosure according to an embodiment of the present disclosure.

FIG. 20 illustrates another contact structure in a device enclosure according to an embodiment of the present disclosure. In this example, a raised portion 2010 of a contact structure may be fit in an opening in device enclosure 2000. Raised portion 2010 may include contacts 2020 each surrounded by an individual raised portion 2012.

Contacts 2020 may be low-profile contacts. Such contacts may allow a contact structure to provide contacts for a connector without consuming a large volume in the electronic device housed by enclosure 2000. In various embodiments the present disclosure, contacts 2020 may be spring-biased contacts. For example, contacts 2020 may be biased by a spring, flexible arm, or other flexible structure such that they may be pushed or depressed and may return to their original position once released. Spring-biased contacts may provide an amount of compliance with contacts in a corresponding connector, thereby assisting in forming electrical connections between multiple contacts 2020 and corresponding contacts of a second connector on a second device (not shown.)

Accordingly, embodiments of the present disclosure may provide contact structures having low-profile, spring-biased contacts. An example is shown in the following figure.

Figure 21:
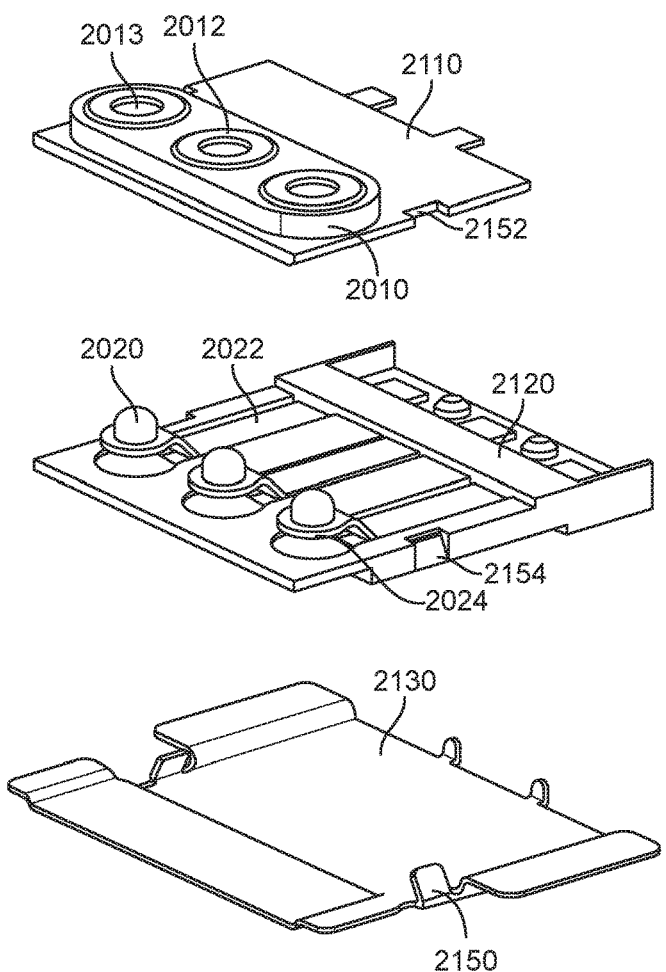
FIG. 21 illustrates a contact structure according to an embodiment of the present disclosure.

FIG. 21 illustrates a contact structure according to an embodiment of the present disclosure. This contact structure may include housing 2120 having a number of slots for contact portions 2022. Contact portions 2022 may connect to contacting portions 2020 via flexible arms 2024.

This contact structure may further include a top plate or cover 2110 having a raised portion 2010. Raised portion 2010 may include further raised portions 2012 around each opening 2013. Each opening 2013 may allow a connection to be made to contacting portion 2020.

This contact structure may further include a bottom plate 2130. Bottom plate 2130 may include tabs 2150 to fit in notch 2152 in top plate or cover 2110 and notch 2154 in housing 2120 to secure top plate or cover 2110, housing 2120, and bottom plate 2130 together as a unit.

In various embodiments of the present disclosure, different portions of this contact structure and other contact structures may be formed of various materials. For example, housing 2120, cover 2110, and bottom plate 2130 may be formed of the same or different materials, such as plastic, LPS, or other non-conductive material. Contacting portions 2020 may be formed of noncorrosive materials, such as gold, gold plated copper, gold plated nickel, gold-nickel alloy, and other materials. Flexible lever arms 2024 and contact portions 2022 may be formed of spring metal, sheet-metal, copper alloy, or other complaint material.

In various embodiments of the present disclosure, different portions of this contact structure and other contact structures may be formed in various ways. For example, housing 2120, cover 2110, and bottom plate 2130 may be formed using injection or other molding, printing, or other technique Contacting portions 2020, flexible lever arms 2024, and contact portions 2022 may be machined, stamped, coined, forged, printed, or formed in different ways. Contact portions 2020 may be attached to flexible lever arms 2024 by riveting, soldering, spot-welding, or other technique, or they may be formed as a single unit. Housing 2120, cover 2110, and bottom plate 2130 may be formed around contacts 2020 using injection molding.

Figure 22:
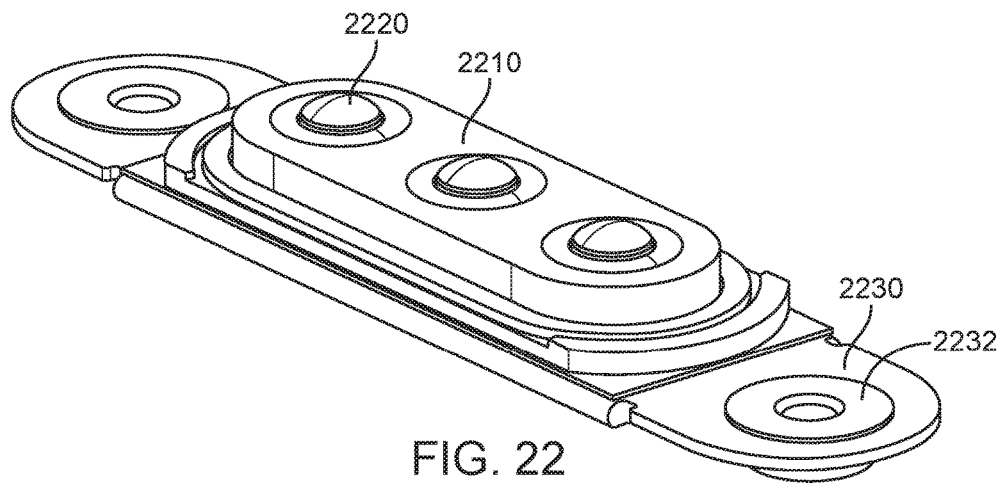
FIG. 22 illustrates a contact structure in a device enclosure according to an embodiment of the present disclosure.

FIG. 22 illustrates a contact structure in a device enclosure according to an embodiment of the present disclosure. In this example, a raised portion 2210 of a contact structure may be fit in an opening in a device enclosure. Raised portion 2210 may include contacts 2220. This contact structure may include bracket 2230. Bracket 2230 may be fixed to a lid, device enclosure, or other structure by inserting fasteners into threaded inserts 2232.

Contacts 2220 may be low-profile contacts. Such contacts may allow a contact structure to provide contacts for a connector without consuming a great deal of volume in the electronic device housed by the enclosure. In various embodiments the present disclosure, contacts 2220 may be spring-biased contacts. For example, contacts 2220 may be biased by a spring, flexible arm, or other flexible structure such that they may be pushed or depressed and may return to their original position once released. Spring-biased contacts may provide an amount of compliance with contacts in a corresponding connector, thereby assisting in forming electrical connections between multiple contacts 2220 and corresponding contacts of a second connector on a second device (not shown.)

This contact structure may be assembled in various ways. An example is shown in the following figure.

Figure 23:
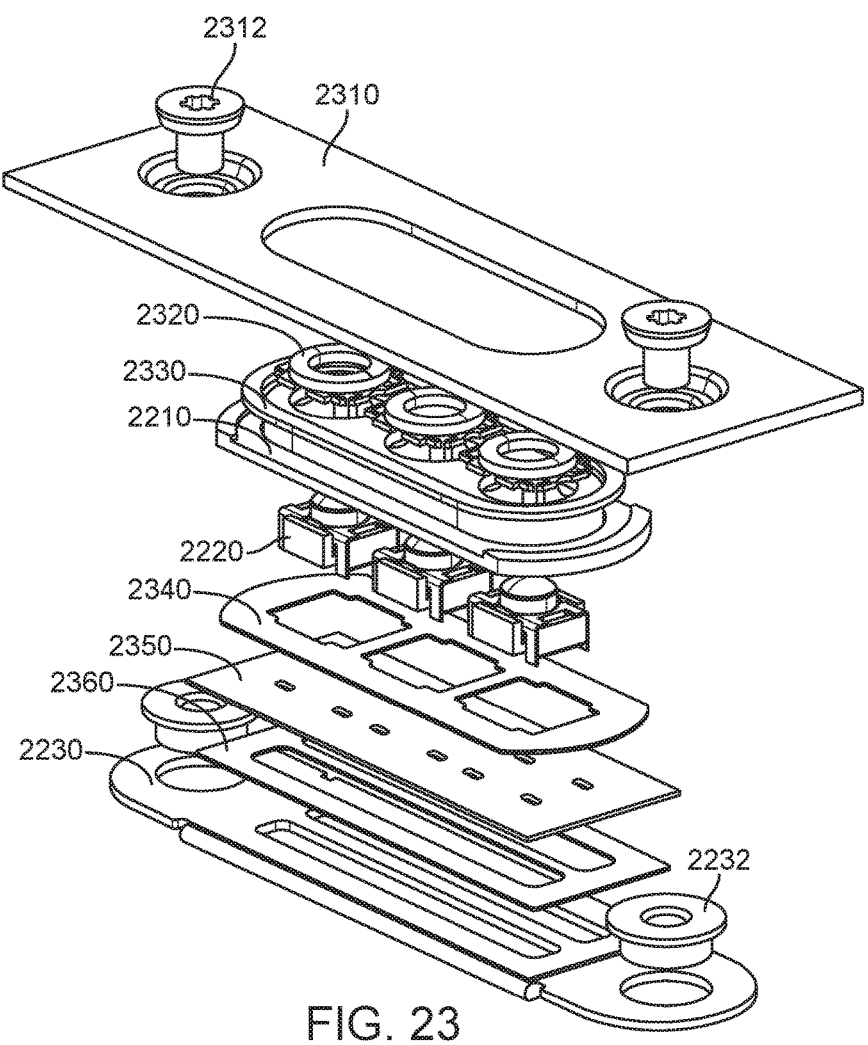
FIG. 23 is an exploded view of a contact structure according to an embodiment of the present disclosure.

FIG. 23 is an exploded view of a contact structure according to an embodiment of the present disclosure. In this example, a flexible circuit board 2350 may include a number of openings for terminals of spring-biased contacts 2220. Spring-biased contacts 2220 may be attached to flexible circuit board 2350 by inserting terminals of spring-biased contacts 2220 into the openings in flexible circuit board 2350 and soldering. A cap 2210 having openings for contacts 2220 may be placed over contacts 2220. Cap 2210 may further include gaskets 2320 in openings in cap 2210. An additional gasket 2330 may be placed or formed between contacts 2220 and inside edges of openings in cap 2210. Gaskets 2320 and 2330 may be formed of silicone or other sealing material. Cap 2210 may be formed as a two shot injection molded process, where the main part of cap 2210 is formed in a first shot and gaskets 2320 are formed in a second shot. Cap 2210 may be attached to flexible circuit board 2350 using a double-sided adhesive layer 2340. Adhesive layer 2340 may be a heat activated film or adhesive layer. Bracket 2230 may be attached using a second adhesive layer 2360 to a bottom of flexible circuit board 2350. Adhesive layer 2360 may also be a heat activated film or adhesive layer. Lid 2310 may be placed over cap 2210. Lid 2310 may be a portion of a device enclosure for a device housing this contact structure. The enclosure may be conducive or nonconductive. Gasket 2330 may be placed around a raised surface of cap 2210 and be located between cap 2210 and lid 2310. Threaded inserts 2232 may be press-fit into openings at ends of bracket 2230. Fasteners, such as screws 2312, may be inserted into openings at ends of lid 2310 and screwed into threaded inserts 2232 in bracket 2230. In other embodiments of the present disclosure, the threaded inserts may be replaced by threaded opening in bracket 2230.

In this example, the contact structure may include three contacts 2220. In other embodiments of the present disclosure, the contact structure may include one, two, or more than three contacts 2220. Also, while in this example each of the contacts 2220 are located in a single raised portion, in other embodiments of the present disclosure, more than one raised portion may be employed, and one or more contact 2220 may be located in portions of the contact structure other than the one or more raised portions. Also, while the three contacts 2220 are shown as being in a line, in other embodiments of the present disclosure, contacts 2220 may be arranged in other patterns.

Various spring-biased contacts 2220 may be used in contacting structures according to embodiments of the present disclosure. An example is shown in the following figures.

Figure 24:
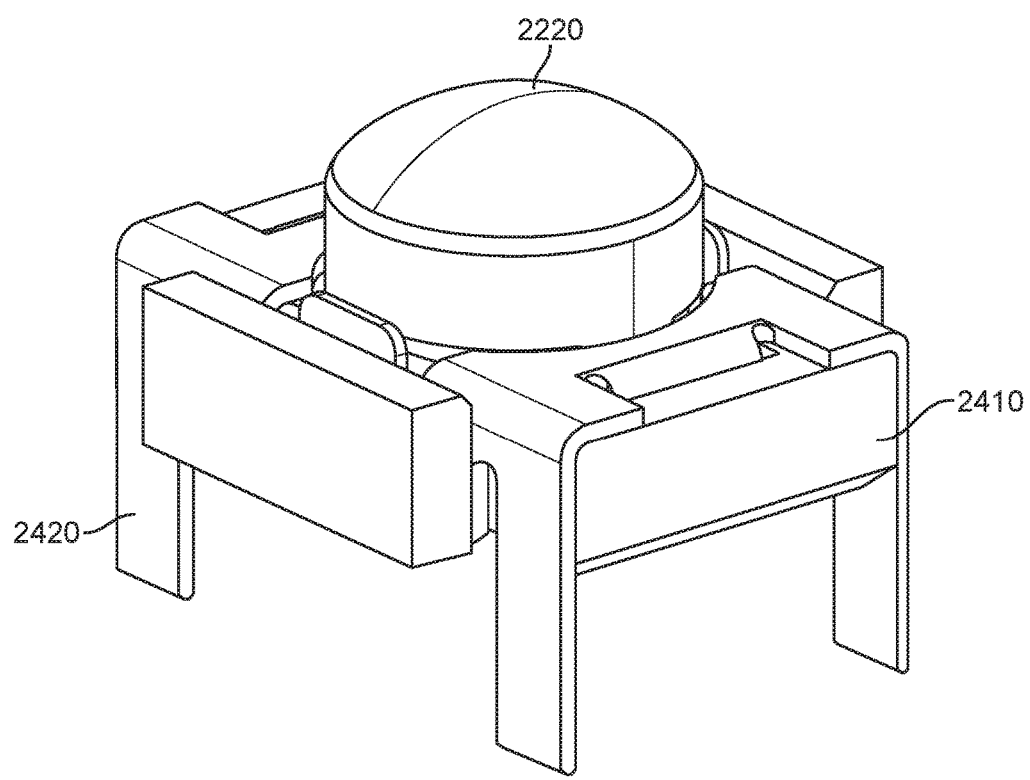
FIG. 24 illustrates a spring-biased contact according to an embodiment of the present disclosure.

FIG. 24 illustrates a spring-biased contact according to an embodiment of the present disclosure. This spring-biased contact may include a contacting portion 2220 supported by housing 2410. Terminal structure 2420 may include legs that may be inserted into openings in a flexible circuit board, printed circuit board, or other appropriate substrate.

Figure 25:
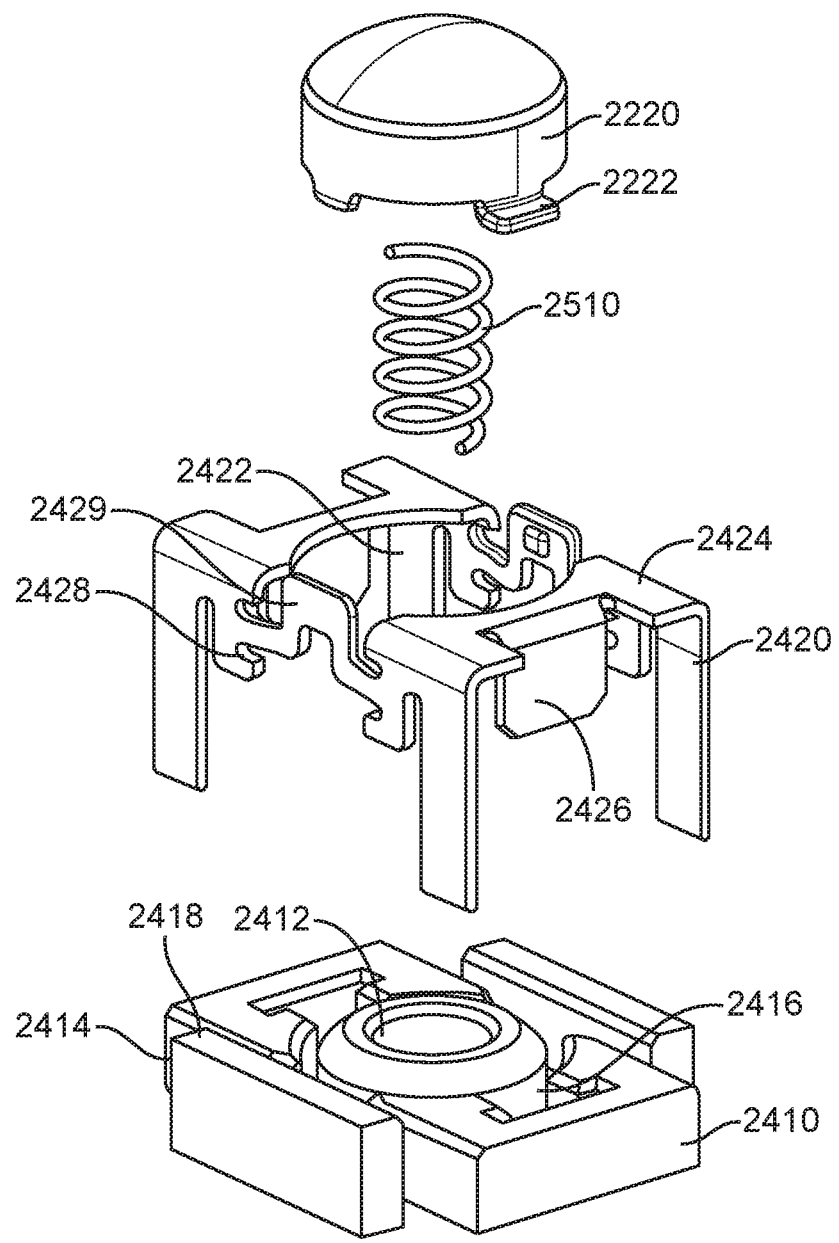
FIG. 25 is an exploded view of a spring-biased contact of FIG. 24.

FIG. 25 is an exploded view of a spring-biased contact of FIG. 24. In this example, housing 2410 may include a central opening 2412. A first end of spring 2510 may be inserted into central opening 2412. Housing 2410 may further include notches 2416 and 2418, as well as corner notches 2414.

A contacting portion 2220 may have a backside cavity (not shown.) A second end of spring 2510 may be inserted into the backside cavity of contacting portion 2220.

Terminal structure 2420 may be fit over contacting portion 2220 such that contacting portion 2220 passes through central opening 2422 of terminal structure 2420. Terminal structure 2420 may include legs which may fit in corner notches 2414. Tabs 2428 and 2426 may fit in notches 2418 and 2416 in housing 2410 to secure terminal structure 2420 in place relative to housing 2410. Contacting portion 2220 may include tabs 2222, which may fit under terminal structure 2420 near portion 2424 to hold contacting portion 2220 in place. Tabs 2428 may include raised portions 2429, which may fit in the back side cavity of contacting portion 2220. Tabs 2429 may help to ensure that electrical contact remains between contacting portion 2220 and terminal 2420 as the contacting portion 2220 is depressed towards housing 2410.

In various embodiments of the present disclosure, different portions of this contact structure and other contact structures may be formed of various materials. For example, cap 2210 and gaskets 2320 may be formed of the same or different materials, such as plastic, LPS, or other nonconductive material. Contacting portions of spring-biased contacts 2220 may be formed of noncorrosive materials, such as gold, gold plated copper, gold plated nickel, gold-nickel alloy, and other materials. Bracket 2230 may be formed of sheet metal or other material.

In various embodiments of the present disclosure, different portions of this contact structure and other contact structures may be formed in various ways. For example, cap 2210 and gaskets 2320 may be formed using injection or other molding, printing, or other technique. Contact portions and other conductive portions of contacts 2220 may be machined, stamped, coined, forged, printed, or formed in different ways.

Embodiments of the present disclosure may provide contact structures that may be located in various types of devices, such as portable computing devices, tablet computers, desktop computers, laptops, all-in-one computers, wearable computing devices, cell phones, smart phones, media phones, storage devices, keyboards, covers, cases, portable media players, navigation systems, monitors, power supplies, adapters, remote control devices, chargers, and other devices. These devices may include contact structures that may provide pathways for signals and power compliant with various standards such as one of the Universal Serial Bus (USB) standards including USB Type-C, HDMI, DVI, Ethernet, DisplayPort, Thunderbolt, Lightning, JTAG, TAP, DART, UARTs, clock signals, power signals, and other types of standard, non-standard, and proprietary interfaces and combinations thereof that have been developed, are being developed, or will be developed in the future. In one example, the contact structures may be used to convey a data signal, a power supply, and ground. In various embodiments of the present disclosure, the data signal may be unidirectional or bidirectional and the power supply may be unidirectional or bidirectional.

The above description of embodiments of the disclosure has been presented for the purposes of illustration and description. It is not intended to be exhaustive or to limit the disclosure to the precise form described, and many modifications and variations are possible in light of the teaching above. The embodiments were chosen and described in order to best explain the principles of the disclosure and its practical applications to thereby enable others skilled in the art to best utilize the disclosure in various embodiments and with various modifications as are suited to the particular use contemplated. Thus, it will be appreciated that the disclosure is intended to cover all modifications and equivalents within the scope of the following claims.

What is claimed is:
1. An accessory device suitable for use with an electronic device, the accessory device comprising:
   a foldable cover;
   a keyboard assembly coupled to the foldable cover, the keyboard assembly comprising a plurality of individually depressible keys; and
   an attachment feature configured to magnetically couple the accessory device with the electronic device, the attachment feature comprising:
      a plurality of openings arranged in a line along a length of the attachment feature;
      a plurality of movable contacts corresponding in number to the plurality of openings, each movable contact extending out of one of the plurality of openings exposing the moveable contact at an exterior surface of the attachment feature;
      one or more biasing members operatively coupled to the plurality of movable contacts to bias the contacts such that a contacting portion of each moveable contact protrudes beyond the exterior surface of the attachment feature through its respective opening; and
      an alignment feature comprising at least one magnet positioned adjacent to the plurality of openings.

2. The accessory device set forth in claim 1 wherein each contact includes a wider body portion and a narrowed end.

3. The accessory device set forth in claim 1 wherein the plurality of openings are formed in a surface that is substantially flush with surrounding exterior surfaces and each contact in the plurality of contacts protrudes above the exterior surface by no more than 1 mm.

4. The accessory device set forth in claim 1 wherein the alignment feature comprises first and second magnets positioned on opposite sides of the plurality of openings.

5. The accessory device set forth in claim 1 wherein the alignment feature comprises a first pair of magnets positioned on a first side of the plurality of openings and a second pair of magnets positions on a second side of the plurality of magnets opposite the first side.

6. The accessory device set forth in claim 1 wherein the foldable cover comprises a plurality of segments sized and shaped to cover a tablet computer.

7. The accessory device set forth in claim 1 wherein each biasing member in the plurality of biasing members comprises a spring.

8. The accessory device set forth in claim 1 wherein the attachment feature is connected to the foldable cover by a flexible member.

9. The accessory device set forth in claim 1 wherein the keyboard assembly includes a retention feature disposed across a top surface of the keyboard assembly, the retention feature configured to provide a mechanical stop for an electronic device secured to the accessory device.

10. The accessory device set forth in claim 1 wherein the attachment feature can be rotated with respect to the foldable cover around an axis that is parallel to a length of the attachment feature.

11. The accessory device set forth in claim 10 further comprising a flexible disposed between the foldable cover and the attachment feature, flexible member configured to enable rotation of the attachment feature relative to the foldable cover is arranged.

12. The accessory device set forth in 1 wherein each of the plurality of contacts comprises a flexible lever arm having first and second ends; and wherein the contact portion is attached to the first end and a barb is formed on the second end and inserted into the housing.

13. An accessory device suitable for use with an electronic device, the accessory device comprising:
a foldable cover;
a keyboard assembly coupled to the foldable cover, the keyboard assembly comprising a plurality of individually depressible keys;
an attachment feature configured to magnetically couple the accessory device with the electronic device, the attachment feature comprising: a plurality of openings arranged in a line along a length of the attachment feature, and a plurality of spring-biased contacts corresponding in number to the plurality of openings, each spring-biased contact comprising a contact portion that extends out of its respective opening in the plurality of openings exposing the spring-biased contact at an exterior surface of the attachment feature; and
an alignment feature comprising at least a first magnet positioned adjacent to and on a first side of the plurality of openings and a second magnet positioned adjacent to and on a second side of the plurality of openings opposite the first side.

14. The accessory device set forth in claim 13 wherein the attachment feature can be rotated with respect to the foldable cover around an axis that is parallel to a length of the attachment feature.

15. The accessory device set forth in claim 14 further comprising a flexible member disposed between the foldable cover and the attachment feature, flexible member configured to enable rotation of the attachment feature relative to the foldable cover is arranged.

16. The accessory device set forth in 13 wherein the keyboard assembly includes a retention feature disposed across a top surface of the keyboard assembly, the retention feature configured to provide a mechanical stop for an electronic device secured to the accessory device.

17. The accessory device set forth in claim 13 wherein each contact includes a wider body portion and a narrowed end.

18. The accessory device set forth in claim 13 wherein the plurality of openings are formed in a surface that is substantially flush with surrounding exterior surfaces and each contact in the plurality of contacts protrudes above the exterior surface by no more than 1 mm.

19. The accessory device set forth in claim 12 wherein the alignment feature comprises first and second arrays of magnets positioned on opposite sides of the plurality of openings.

20. The accessory device set forth in claim 13 wherein the keyboard assembly is coupled to the foldable cover in a manner that allows the keyboard assembly to rotate with respect to the foldable cover.

* * * * *